United States Patent
Watanabe et al.

(10) Patent No.: US 10,719,228 B2
(45) Date of Patent: Jul. 21, 2020

(54) IMAGE PROCESSING APPARATUS, IMAGE PROCESSING SYSTEM, AND IMAGE PROCESSING METHOD

(71) Applicants: Ayako Watanabe, Kanagawa (JP); Shigeru Nakamura, Kanagawa (JP); Tatsuyuki Oikawa, Tokyo (JP)

(72) Inventors: Ayako Watanabe, Kanagawa (JP); Shigeru Nakamura, Kanagawa (JP); Tatsuyuki Oikawa, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 7 days.

(21) Appl. No.: 16/032,254

(22) Filed: Jul. 11, 2018

(65) Prior Publication Data
US 2018/0321840 A1 Nov. 8, 2018

Related U.S. Application Data

(63) Continuation of application No. PCT/JP2016/085280, filed on Nov. 29, 2016.

(30) Foreign Application Priority Data

Feb. 12, 2016 (JP) ................................. 2016-025359

(51) Int. Cl.
*G06F 3/0488* (2013.01)
*G06F 3/0484* (2013.01)
(Continued)

(52) U.S. Cl.
CPC ...... *G06F 3/04883* (2013.01); *G06F 3/03545* (2013.01); *G06F 3/0416* (2013.01);
(Continued)

(58) Field of Classification Search
CPC ............. G06F 3/04883; G06F 3/03545; G06F 3/04842; G06F 3/0486; G06F 3/0421
See application file for complete search history.

(56) References Cited

U.S. PATENT DOCUMENTS 5,790,114 A 8/1998 Geaghan et al.
6,518,960 B2 2/2003 Omura et al.
(Continued)

FOREIGN PATENT DOCUMENTS

JP 2000-043484 2/2000
JP 2003-069767 3/2003
(Continued)

OTHER PUBLICATIONS

International Search Report dated Jan. 24, 2017 in PCT/JP2016/085280 filed on Nov. 29, 2016.
(Continued)

*Primary Examiner* — Lixi C Simpson
(74) *Attorney, Agent, or Firm* — IPUSA, PLLC

(57) ABSTRACT

An image processing apparatus connected to an image display apparatus that displays visual information including handwritten data superimposed on a display image is provided. The image processing apparatus displays a plurality of screens, including a first screen and a second screen that is different from the first screen, and causes the image display apparatus to display a screen selected from among the first screen and the second screen. The image processing apparatus selects the screen from among the first screen and the second screen to generate the display image of the selected screen, based on a graphical user interface that accepts input of an operation of selecting the screen from among the first screen and the second screen or an operation of instructing generation of the display image.

11 Claims, 14 Drawing Sheets

(51) Int. Cl.
  *G06F 3/042*    (2006.01)
  *G06F 3/0354*   (2013.01)
  *G06F 3/0486*   (2013.01)
  *G06F 3/041*    (2006.01)
  *G06F 3/14*     (2006.01)

(52) U.S. Cl.
  CPC .......... *G06F 3/0486* (2013.01); *G06F 3/0488* (2013.01); *G06F 3/04842* (2013.01); *G06F 3/1462* (2013.01); *G06F 3/0421* (2013.01); *G09G 2370/04* (2013.01)

(56) References Cited

U.S. PATENT DOCUMENTS

| | | | | |
|---|---|---|---|---|
| 8,407,375 | B2* | 3/2013 | Yamamoto | G06F 3/023 |
| | | | | 710/20 |
| 9,965,238 | B2* | 5/2018 | Han | H04N 21/4126 |
| 2002/0075250 | A1 | 6/2002 | Shigeta et al. | |
| 2008/0270901 | A1* | 10/2008 | Muto | G11B 27/105 |
| | | | | 715/705 |
| 2012/0062591 | A1 | 3/2012 | Omura et al. | |
| 2012/0081390 | A1* | 4/2012 | Cui | G06F 16/9577 |
| | | | | 345/619 |
| 2013/0283198 | A1* | 10/2013 | Kemmochi | G06F 3/0481 |
| | | | | 715/772 |
| 2013/0307796 | A1* | 11/2013 | Liu | G06F 3/041 |
| | | | | 345/173 |
| 2014/0365957 | A1* | 12/2014 | Louch | G06F 3/1431 |
| | | | | 715/790 |

FOREIGN PATENT DOCUMENTS

| | | |
|---|---|---|
| JP | 2006-146629 | 6/2006 |
| JP | 2008-193402 | 8/2008 |
| JP | 2012-084122 | 4/2012 |

OTHER PUBLICATIONS

Extended European Search Report for 16889924.3 dated Dec. 19, 2018.

Japanese Office Action for 2017-566528 dated Mar. 10, 2020.

* cited by examiner

IMAGE PROCESSING APPARATUS, IMAGE PROCESSING SYSTEM, AND IMAGE PROCESSING METHOD

CROSS-REFERENCE TO RELATED APPLICATIONS

The present application is a continuation application filed under 35 U.S.C. 111(a) claiming benefit under 35 U.S.C. 120 and 365(c) of PCT International Application No. PCT/JP2016/085280 filed on Nov. 29, 2016 and designating the U.S., which claims priority to Japanese Patent Application No. 2016-025359 filed on Feb. 12, 2016. The entire contents of the foregoing applications are incorporated herein by reference.

BACKGROUND OF THE INVENTION

1. Field of the Invention

The present invention relates to an image processing apparatus, an image processing system, and an image processing method.

2. Description of the Related Art

In conferences held at corporations, educational institutions, governmental agencies, and the like, electronic blackboards that can display a background image on a large display and allow a user to draw stroke images, such as characters, numbers, and/or figures, on the background image being displayed are conventionally used.

With respect to systems implementing such electronic blackboards, techniques are known for achieving miniaturization and integration of the overall system and improving operability, handling, and convenience, for example. As a specific example, an electronic blackboard system is known that includes a display device that displays characters and images, a touch input device that has a touch panel surface arranged on the front face of the display device, a printing device, and a control device that controls display by the display device based on input from the touch input device and printing by the printing device. In such an electronic blackboard system, a plurality of connection terminals are used for establishing connection with information processing apparatuses, such as a digital camera, a DVD player, video equipment, and the like, and the display device can be used as a large screen monitor. In such an electronic blackboard system, a user does not have to use a personal computer to establish connection with an information processing apparatus or operate the information processing apparatus. In this way, operability, handling, and convenience of the electronic blackboard system may be improved (e.g., see Japanese Unexamined Patent Publication No. 2000-43484).

However, in a system including an image processing apparatus that has a display and is connected to an image display apparatus corresponding to an electronic blackboard, for example, different screens may be displayed on the image display apparatus and the display of the image processing apparatus. That is, a plurality of screens may exist. In such a case, when capturing a screen to generate a display image of the screen, the image processing apparatus may not be able to clearly determine which screen from among the plurality of screens is the capture target such that a display image desired by the user may not be generated.

SUMMARY OF THE INVENTION

One aspect of the present invention is directed to providing an image processing apparatus that is capable of selecting a screen desired as a display image by the user and generating the display image desired by the user.

According to one embodiment of the present invention, an image processing apparatus connected to an image display apparatus that displays visual information including handwritten data superimposed on a display image is provided. The image processing apparatus includes circuitry configured to implement processes of displaying a plurality of screens, including a first screen and a second screen that is different from the first screen, and causing the image display apparatus to display a screen selected from among the first screen and that second screen. The circuitry further implements processes of selecting the screen from among the first screen and the second screen to generate the display image of the selected screen, based on a graphical user interface that accepts input of an operation of selecting the screen from among the first screen and the second screen or an operation of instructing generation of the display image.

BRIEF DESCRIPTION OF THE DRAWINGS

FIG. 7 is a diagram illustrating example screens displayed by the image processing apparatus according to an embodiment of the present invention;

FIG. 8 is a diagram illustrating example screens displayed when "duplicate" is set up in the image processing apparatus according to an embodiment of the present invention;

FIG. 11 is a diagram illustrating example screens displayed when "extend" is set up in the image processing apparatus according to an embodiment of the present invention;

DESCRIPTION OF THE EMBODIMENTS

In the following, embodiments of the present invention are described with reference to the accompanying drawings.

System Example

Figure 1:
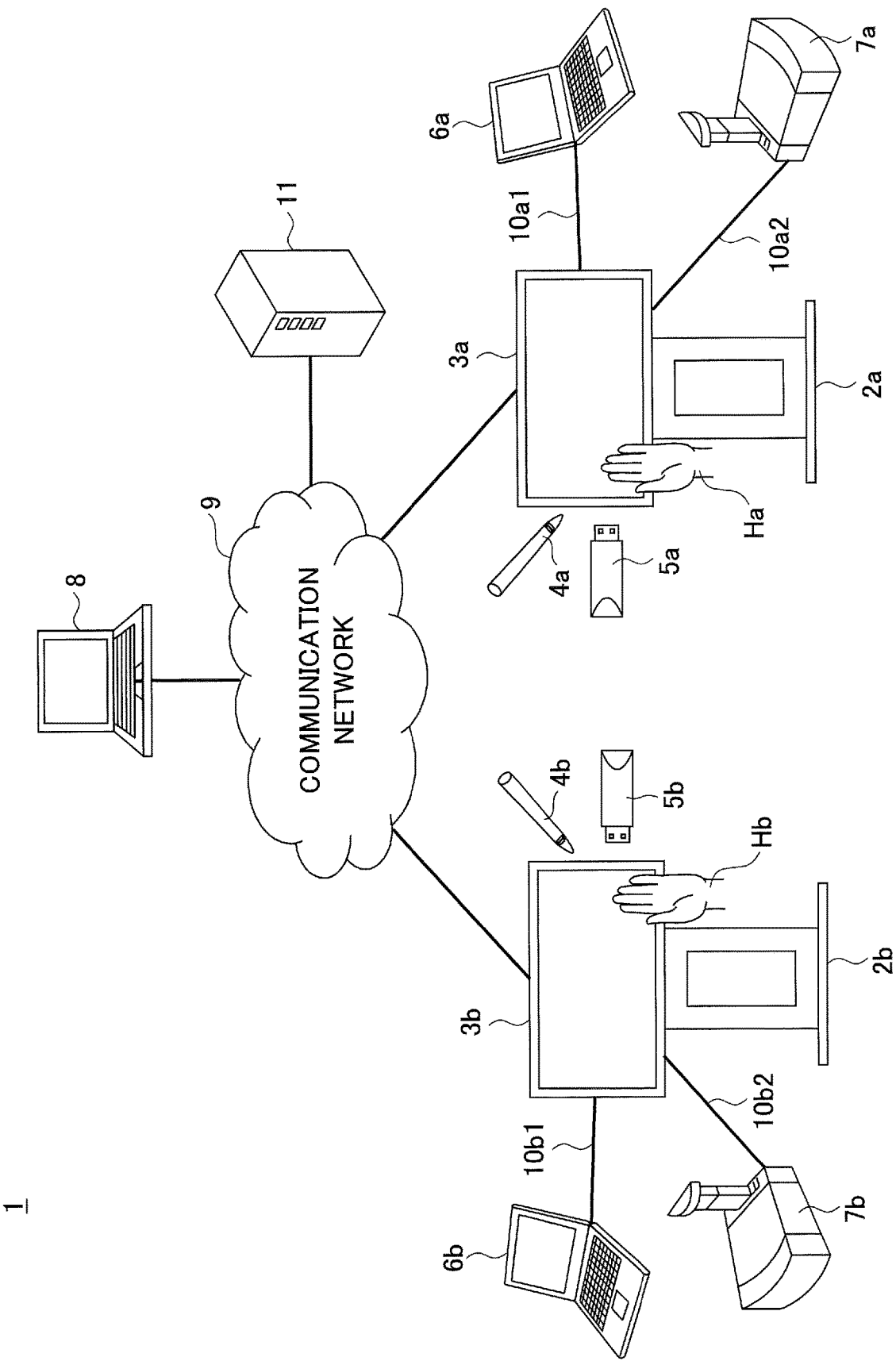
FIG. 1 is an example overall configuration diagram of an image processing system according to an embodiment of the present invention.

FIG. 1 is an overall configuration diagram of an image processing system 1 according to an embodiment of the present invention. Note that in FIG. 1, only two electronic blackboards 2a and 2b corresponding to example image display apparatuses and associated peripheral devices such as electronic pens 4a and 4b are illustrated to simplify the description. However, the image processing system 1 may include three or more electronic blackboards, electronic pens, and the like. In FIG. 1, the image processing system 1 includes a plurality of electronic blackboards 2a and 2b, a plurality of electronic pens 4a and 4b, USB memories 5a and 5b, notebook PCs (Personal Computers) 6a and 6b corresponding to example image processing apparatuses, television (video) conference terminals 7a and 7b, an account server 11, and a PC 8 that are communicably connected to each other via a communication network 9. Further, the plurality of electronic blackboards 2a and 2b have displays 3a and 3b, respectively.

Also, the electronic blackboard 2a is capable of displaying an image drawn by an event generated by the electronic pen 4a (e.g., pen tip of the electronic pen 4a or tail end of the electronic pen 4a touching the display 3a) on the display 3a. Note that in addition to responding to an event generated by the electronic pen 4a, the electronic blackboard 2a is capable of changing an image displayed on the display 3a based on an event generated by a hand Ha of a user (gesture such as enlargement, reduction, page turning), for example. In response to the event, position information indicated by the electronic pen 4a or the hand Ha is input to the electronic blackboard 2a.

The USB memory 5a can be connected to the electronic blackboard 2a. The electronic blackboard 2a can retrieve an electronic file such as a PDF (Portable Document Format) file from the USB memory 5a, and the electronic blackboard 2a can record an electronic file in the USB memory 5a, for example. Also, the notebook PC 6a is connected to the electronic blackboard 2a via a cable 10a1 that supports communication according to a standard such as DisplayPort (registered trademark), DVI (Digital Visual Interface), HDMI (High-Definition Multimedia Interface; registered trademark), or VGA (Video Graphics Array). In response to an event generated by a touch of the display 3a, the electronic blackboard 2a transmits event information of the generated event to the notebook PC 6a in a manner similar to the case of transmitting event information of an event generated by an input device, such as a mouse or a keyboard, to thereby control the notebook PC 6a. Similarly, the television (video) conference terminal 7a is connected to the electronic blackboard 2a via a cable 10a2 that supports communication according to any of the above standards. Note that the notebook PC 6a and the video conference terminal 7a may establish communication with the electronic blackboard 2a by wireless communication according to any of various wireless communication protocols such as Bluetooth (registered trademark).

Meanwhile, at another site where the electronic blackboard 2b is installed, the electronic blackboard 2b having the display 3b, the electronic pen 4b, the USB memory 5b, the notebook PC 6b, the video conference terminal 7b, and cables 10b1 and 10b2 are used in a similar manner as the above-described electronic blackboard 2a and associated devices. Further, the electronic blackboard 2b is capable of changing an image displayed on the display 3b based on an event generated by a hand Hb of a user, for example.

In this way, an image drawn on the display 3a of the electronic blackboard 2a at one site may also be displayed on the display 3b of the electronic blackboard 2b at another site, and conversely, an image drawn on the display 3b of the electronic blackboard 2b at the other site may be displayed on the display 3a of the electronic blackboard 2a at the one site. As described above, the image processing system 1 can perform a remote sharing process of enabling image display apparatuses at remote locations to share the same image, and as such, the image processing system 1 may be very convenient when used in a conference having participants at remote locations, for example.

<Terminology>

In the following description, an electronic blackboard from among the plurality of electronic blackboards will generically be referred to as "electronic blackboard 2". Also, a display from among the displays of the plurality of electronic blackboards 2 will generically be referred to as "display 3". Also, an electronic pen from among the plurality of electronic pens will generically be referred to as "electronic pen 4". Also, a USB memory from among the plurality of USB memories will generically be referred to as "USB memory 5". Also, a notebook PC from among the plurality of notebook PCs will generically be referred to as "notebook PC 6". Also, a video conference terminal from among the plurality of video conference terminals will generically be referred to as "video conference terminal 7". Also, a hand from among the hands of a plurality of users will generically be referred to as "hand H". Also, a cable from among the plurality of cables will generically be referred to as "cable 10".

Note that although an electronic blackboard will be described as an example image display apparatus according to the present embodiment, the present invention is not limited thereto. Other examples of the image display apparatus include an electronic signage (digital signage), a telestrator used in sports and weather broadcasts, a remote image (video) diagnostic apparatus, and the like. Also, although the notebook PC 6 will be described as an example image processing apparatus according to the present embodiment, the present invention is not limited thereto. Other examples of the image processing apparatus include a desktop PC, a tablet PC, a PDA (personal digital assistant), a digital video camera, a digital camera, a game machine, and other types of terminals that are capable of supplying image frames. Further, the communication network 9 includes the Internet, a LAN (Local Area Network), a cellular phone communication network, and the like. Also, although a USB memory is described as an example recording medium according to the present embodiment, the present invention is not limited thereto, and other examples of the recording medium include an SD card and other various types of recording media.

Visual information refers to information that can be visually recognized by a person. Note that although the information does not necessarily have to have any meaning, in many cases, visual information includes characters, figures, symbols, and/or combinations thereof that have some meaning to the viewing person.

Also, handwritten data drawn on the electronic blackboard by a user is referred to as a stroke image.

<Image Processing System Use Example>

For example, a user may use the image processing system in the following manner.

Figure 2:
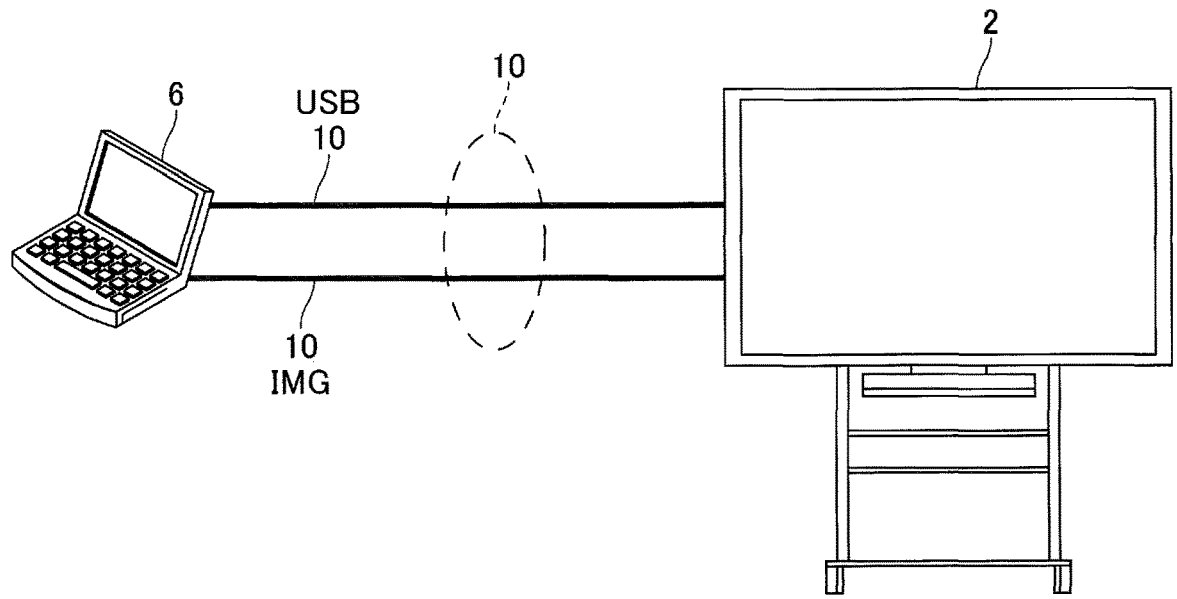
FIG. 2 is an example conceptual diagram illustrating a use example of the image processing system according to an embodiment of the present invention.

FIG. 2 is an example conceptual diagram illustrating a use example of the image processing system according to the present embodiment. Note that an example in which the notebook PC 6 and the electronic blackboard 2 are connected to each other will be described below. Specifically, in the present example, it is assumed that the notebook PC 6 and the electronic blackboard 2 are connected by two cables 10. For example, one of the cables 10 may be a USB cable 10USB and the other cable may be a video display cable 10IMG.

The USB cable 10USB is an example of a cable for a touch panel. That is, when a user draws an object on the electronic blackboard 2 using the electronic pen 4 or the like, data indicating the position where the electronic blackboard 2 has been touched at the time of drawing is transmitted from the electronic blackboard 2 to the notebook PC 6 via the USB cable 10USB.

The video display cable 10IMG transmits data for causing the electronic blackboard 2 to display material (data) displayed by the notebook PC 6. That is, the image display cable 10IMG transmits image data from the notebook PC 6 to the electronic blackboard 2.

Thus, in the illustrated configuration, two screens are displayed, including a screen displayed on the notebook PC 6 and a screen displayed on the electronic blackboard 2. In the following, an example where two screens are displayed will be described.

In using the electronic blackboard 2, if security is a substantial concern, for example, a user may not be allowed to use the electronic blackboard 2 unless the user is using a device that has a security policy implemented. Specifically, the user may not be able to use a device having a communication function unless a specific security software is installed in the device, for example. In such a case, to use the electronic blackboard 2 through the notebook PC 6, the user may install an application program (hereinafter simply referred to as "application") for using the electronic blackboard 2 in the notebook PC 6.

That is, assuming the notebook PC 6 corresponds to the device having a security policy implemented in the illustrated example, the user may be able to use various functions of the electronic blackboard 2 by installing the application in the notebook PC 6. For example, an image imported by the application may be displayed on the electronic blackboard 2 by the application. Note that in order to enable use of various functions provided by the application, the notebook PC 6 displays an application screen. When the user inputs an operation with respect to the application screen, the notebook PC 6 may change the screen displayed on the electronic blackboard 2, for example.

A capture function is an example of a function provided by the application that may be used. The user may draw an object on a blank screen of the electronic blackboard 2, for example. Alternatively, the notebook PC 6 may capture material prepared by the user and cause the electronic blackboard 2 to display the captured material, and the user may draw an object on the displayed material that is displayed on the electronic blackboard 2. Note that the displayed material may be data generated using a presentation program such as PowerPoint (registered trademark), for example.

The image processing system may also be used in the following manner.

Figure 3:
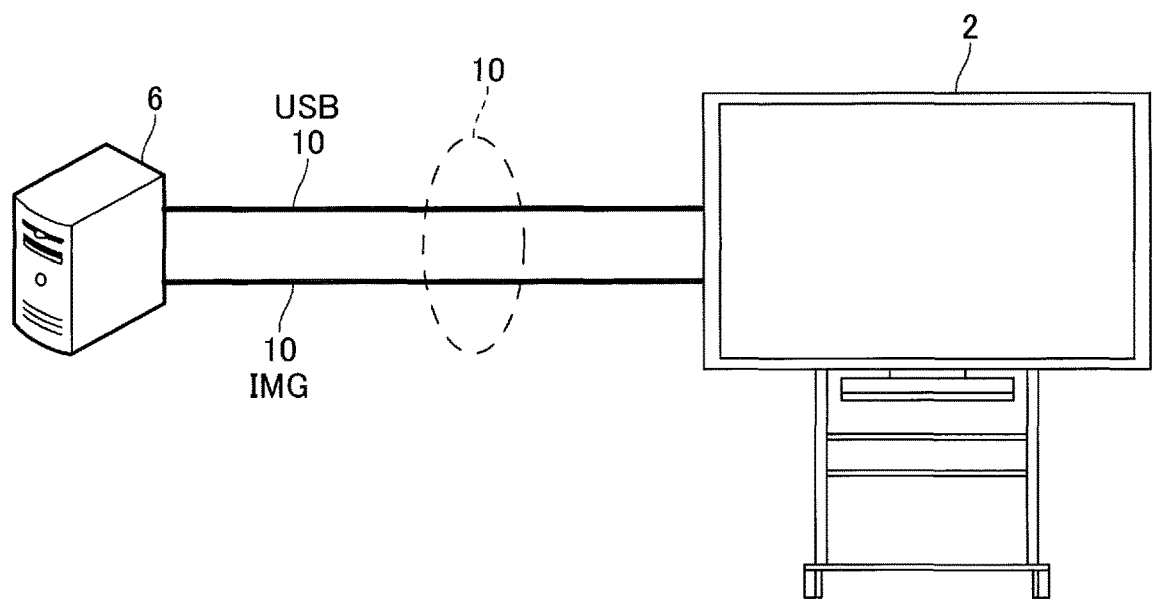
FIG. 3 is an example conceptual diagram illustrating another use example of the image processing system according to an embodiment of the present invention.

FIG. 3 is an example conceptual diagram illustrating another use example of the image processing system according to the present embodiment. The example of FIG. 3 differs from the example of FIG. 2 in that a so-called desktop PC is used as the image processing apparatus instead of the notebook PC 6. That is, the image processing apparatus used in the present embodiment is not limited to a notebook PC and may be some other type of information processing apparatus such as a tablet PC or a desktop PC as illustrated in FIG. 3, for example.

<Hardware Configuration Example>

The electronic blackboard 2 may have the following hardware configuration, for example.

Figure 4:
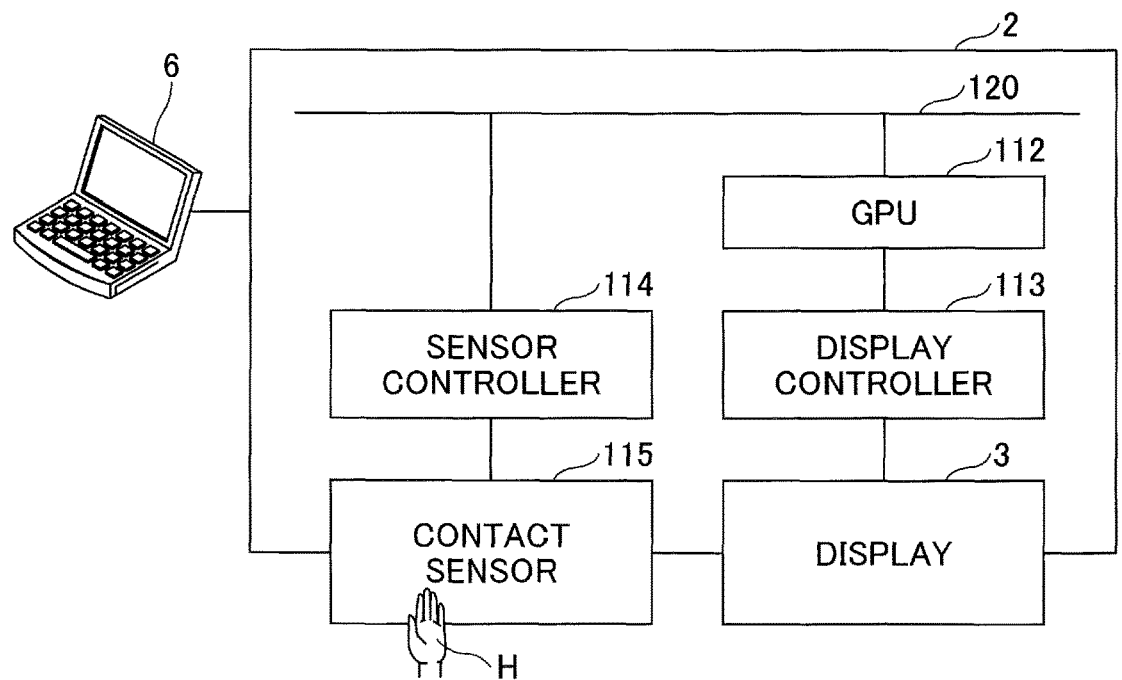
FIG. 4 is an example hardware configuration diagram of an image display apparatus according to an embodiment of the present invention.

FIG. 4 is an example hardware configuration diagram of the image display apparatus according to the present embodiment. As illustrated in FIG. 4, the electronic blackboard 2 may include a GPU (Graphics Processing Unit) 112, a display controller 113, the display 3, a contact sensor 115, and a sensor controller 114.

The GPU 112 is a computing device and a control device that performs computations and control relating to image processing.

The display controller 113 is a computing device and a control device that performs computations and screen display control for displaying an output image output from the GPU 112 on the display 3.

The display 3 is an output device that displays a display image such as an image input by the notebook PC 6, for example.

The sensor controller 114 is a computing device that performs computations such as calculating coordinate values from sensor data input by the contact sensor 115.

The contact sensor 115 is a sensor for detecting contact of the hand H and the position of contact of the hand H. For example, the contact sensor 115 may detect the position touched by the hand H using infrared ray shielding technology and output sensor data indicating the coordinates of the position touched by the hand H. Specifically, in the infrared ray shielding technology, first, two light receiving/emitting devices installed at upper side end portions of the display 3 irradiate a plurality of infrared rays in parallel to the display 3. Then, the irradiated infrared rays are reflected by reflecting members provided around the display 3. Then, a light receiving element receives the reflected infrared rays. Then, the contact sensor 115 outputs to the sensor controller 114 the IDs (identification) of infrared rays irradiated by the light receiving/emitting device that have been shielded by an object such as the hand H. In this way, based on the IDs of the infrared rays, the sensor controller 114 can indicate the coordinate values of the position of contact of the object.

The bus 120 electrically connects the respective hardware components with each other. That is, the bus 120 may be a so-called address bus, a data bus, or the like.

Note that the electronic blackboard 2 is not limited to the illustrated hardware configuration. For example, the electronic blackboard 2 may include additional devices, such as a computing device, a control device, and/or a storage device.

Also, the notebook PC 6 may have the following hardware configuration, for example.

Figure 5:
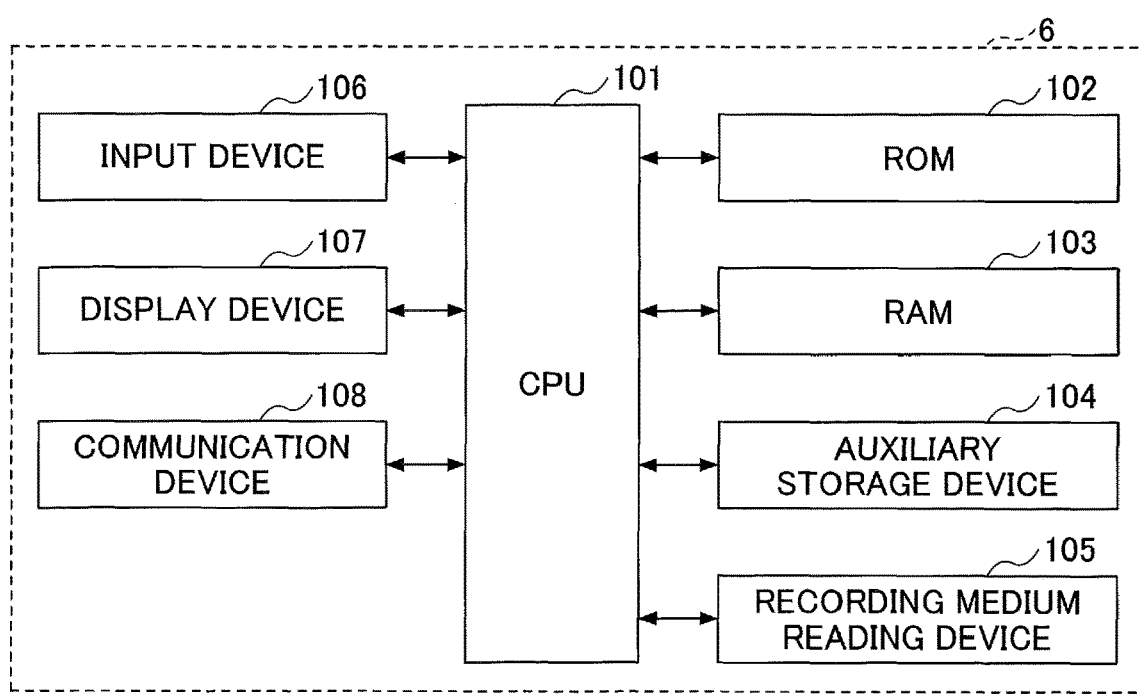
FIG. 5 is an example hardware configuration diagram of an image processing apparatus according to an embodiment of the present invention.

FIG. 5 is an example hardware configuration diagram of the image processing apparatus according to the present embodiment.

The notebook PC 6 mainly includes a CPU (Central Processing Unit) 101, a ROM (Read Only Memory) 102, a RAM (Random Access Memory) 103, an auxiliary storage device 104, a recording medium reading device 105, an input device 106, a display device 107, and a communication device 108. In the following, the above components are briefly described.

The CPU 101 includes a microprocessor and peripheral circuits and is configured to control the entire notebook PC 6. The ROM 102 is a memory for storing predetermined control programs (software components) to be executed by the CPU 101. The RAM 103 is used as a work area when the CPU 101 executes a predetermined control program (software component) stored in the ROM 102 to implement relevant control processes.

The auxiliary storage device 104 is a device that stores various types of information including a general-purpose OS, device information, and setting information on firewall. For example, a nonvolatile storage device such as a HDD (Hard Disk Drive) or the like may be used as the auxiliary storage device 104. Note that the above information may also be stored in some other storage medium other than the auxiliary storage device 104, such as a CD-ROM (Compact Disk Read-Only Memory) or a DVD (Digital Versatile Disk), for example. The various information stored in these recording media may be read by a computer via a drive device such as the recording medium reading device 105. Further, the computer may obtain various types of information by loading a recording medium in the recording medium reading device 105, for example.

The input device 106 is a device for enabling a user to perform various input operations. The input device 106 may include a mouse, a keyboard, and a touch panel switch that is arranged over the display screen of the display device 107, for example. The input device 106 may be an interface for a connector that acquires data from an external device such as an electronic blackboard via a cable, for example. The display device 107 may be an LCD (Liquid Crystal Display) or a CRT (Cathode Ray Tube), for example. The communication device 108 is a device that communicates with an external device via a network. The communication device 108 supports communication according to various network configurations including a wired network, a wireless network, and the like.

<Functional Configuration Example>

By installing the application in the notebook PC 6, for example, the notebook PC 6 may implement the following functional configuration.

Figure 6:
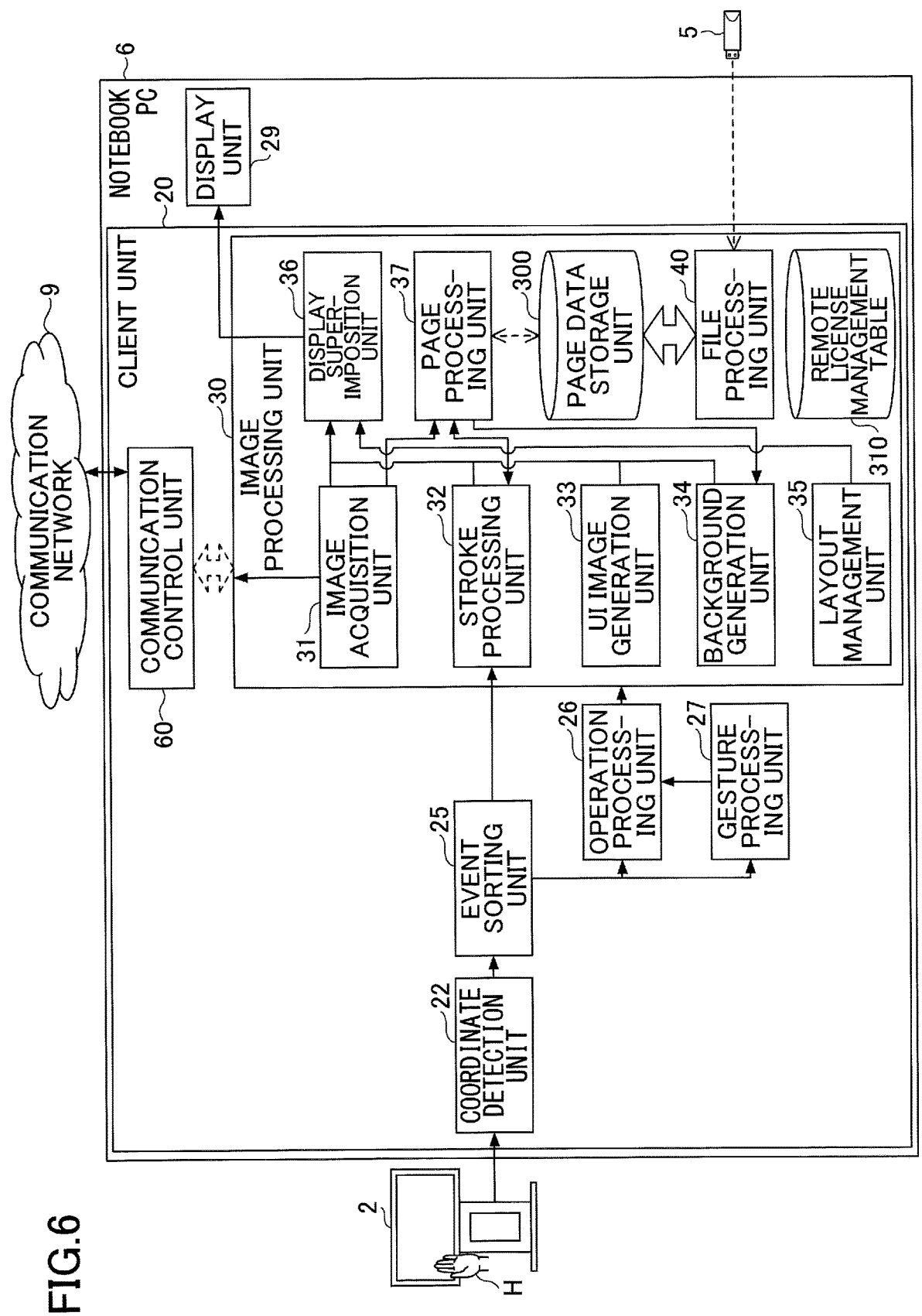
FIG. 6 is an example functional configuration diagram of the image processing apparatus according to an embodiment of the present invention.

FIG. 6 is an example functional configuration diagram of the image processing apparatus according to the present embodiment. In FIG. 6, the notebook PC 6 includes a client unit 20 and a display unit 29. The client unit 20 includes a coordinate detection unit 22, an event sorting unit 25, an operation processing unit 26, a gesture processing unit 27, an image processing unit 30, and a communication control unit 60.

The coordinate detection unit 22 acquires data indicating coordinate values input from the electronic blackboard 2. For example, the coordinate detection unit 22 may be implemented by the input device 106 (FIG. 5) or the communication device 108 (FIG. 5).

The event sorting unit 25 sorts an event corresponding to an operation input to the electronic blackboard 2 as either a stroke drawing, a UI (user interface) operation, or a gesture operation based on the data (i.e., coordinate values) acquired by the coordinate detection unit 22. For example, the event sorting unit 25 may be implemented by the CPU 101 (FIG. 5).

Note that a stroke drawing corresponds to an event that occurs while a stroke image is displayed on the electronic blackboard 2 and includes operations from when the user presses the hand H against the electronic blackboard 2 and moves the hand H on the electronic blackboard 2 in the pressed state up until the user releases the pressed hand H from the electronic blackboard 2. For example, a character such as "S" or "T" of the alphabet may be drawn on the electronic blackboard 2 by a stroke drawing. Note that a stroke drawing also includes an event of deleting or editing a stroke image such as a character that has been drawn, for example.

A gesture operation corresponds to an event that occurs while a stroke image is displayed on the electronic blackboard 2 and includes an operation of the user changing the image being displayed with the hand H. For example, the image being displayed may be enlarged or reduced, the display area of the image may be changed, a page may be turned, or a combination of such changes may be made by the gesture operation.

Further, a UI operation corresponds to an operation on a UI displayed on the electronic blackboard 2.

When an event that is sorted as a UI operation by the event sorting unit 25 occurs, the operation processing unit 26 performs processing based on the type of UI that has been operated. The type of UI may be, for example, a button, a list, a check box, a text box, or the like. For example, the operation processing unit 26 may be implemented by the CPU 101 (FIG. 5).

When an event that is sorted as a gesture operation by the event sorting unit 25 occurs, the gesture processing unit 27 performs processing based on the type of gesture. More specifically, when an enlargement gesture operation is input, the gesture processing unit 27 performs a process of enlarging the image corresponding to the gesture target. For example, the gesture processing unit 27 may be implemented by the CPU 101 (FIG. 5).

The image processing unit 30 includes an image acquisition unit 31, a stroke processing unit 32, a UI image generation unit 33, a background generation unit 34, a layout management unit 35, a display superimposition unit 36, a page processing unit 37, a page data storage unit 300, a file processing unit 40, and a remote license management table 310.

The image acquisition unit 31 acquires frames of video acquired from an external device as images. The image acquisition unit 31 also outputs image data to the page processing unit 37. The image data represents an output image from the video output device (e.g., notebook PC 6).

When an event that is sorted by the event sorting unit 25 as a stroke drawing occurs, the stroke processing unit 32 draws, deletes, or edits an image based on the stroke drawing event. Note that an image generated by a stroke drawing corresponds to a stroke image.

The UI image generation unit 33 generates an image of a UI, i.e., an icon, that is preset in the electronic blackboard 2.

The background generation unit 34 receives from the page processing unit 37, media data representing a background that is included in page data retrieved by the page processing unit 37 from the page data storage unit 300. Then, the background generation unit 34 outputs the received media data to the display superimposition unit 36. Note that the background may be a plain background or a grid background, for example.

The layout management unit 35 manages the layout of images output from the image acquisition unit 31, the stroke processing unit 32, the UI image generation unit 33, and the background generation unit 34 to the display superimposition unit 36. By managing the layout of the images, the layout management unit 35 can provide an instruction on where to display an output image and a stroke image in a UI image and a background image, or an instruction to not display (hide) a certain image, for example.

The display superimposition unit 36 lays out the images output from the image acquisition unit 31, the stroke processing unit 32, the UI image generation unit 33, and the background generation unit 34 according to an instruction based on the layout of the images from the layout management unit 35.

The page processing unit 37 outputs stroke arrangement data (stroke data of each stroke in stroke image) included in the stored page data to the stroke processing unit 32 so that a stroke can be edited again. Further, the page processing unit 37 can delete or duplicate the stored page data.

When the page processing unit 37 stores page data in the page data storage unit 300, data of the output image displayed on the display is stored in the page data storage unit 300. When the stored page data is retrieved from the page data storage unit 300, the data of the output image is retrieved as media data representing the background. The page processing unit 37 then outputs the stroke arrangement data representing a stroke image that is included in the page data retrieved from the page data storage unit 300 to the stroke processing unit 32. Further, the page processing unit 37 outputs the media data representing the background that is included in the page data retrieved from the page data storage unit 300 to the background generation unit 34.

The display superimposition unit 36 superimposes the output image output from the image acquisition unit 31, the stroke image output from the stroke processing unit 32, the UI image output from the UI image generation unit 33, and the background image output from the background generation unit 34 according to an instruction based on the layout of the images from the layout management unit 35. In this way, the display superimposition unit 36 can arrange the output image, the stroke image, the UI image, and the background image into superimposed image layers that can be viewed by a user in the above recited order even when the images are superimposed.

The file processing unit 40 performs a process of outputting data input from an external device such as the USB memory 5 or outputting data to an external device such as the USB memory 5. That is, the file processing unit 40 performs input/output operations with respect to the USB memory 5 or the like. Note that a file input from the USB memory 5 may be stored in the page data storage unit 300, and a file to be output to the USB memory 5 may be retrieved from the page data storage unit 300. For example, the file processing unit 40 may be implemented by the input device 106 (FIG. 5).

The remote license management table 310 manages licenses used for communicating with external devices connected via the communication network 9 and the like. For example, the remote license management table 310 may be implemented by the auxiliary storage device 104 (FIG. 5).

The display unit 29 displays an image generated by the display superimposition unit 36 on an output device such as a display or an external device connected thereto. For example, the display unit 29 may be implemented by the display device 107 (FIG. 5).

The communication control unit 60 communicates with an external device via the communication network 9 and transmits/receives data. For example, the communication control unit 60 may be implemented by the communication device 108 (FIG. 5).

<Screen Example and Setting Example>

In the following, an example in which Windows (registered trademark) is used as the OS (Operating System) running on the notebook PC 6 will be described. However, embodiments of the present invention are not limited to cases where the OS is Windows (registered trademark). That is, the OS may be some system software other than Windows (registered trademark).

In the following description, it is assumed that a plurality of displays are connected to the notebook PC 6. An example of such an arrangement includes FIG. 2 in which the electronic blackboard 2 is connected to the notebook PC 6. That is, the notebook PC 6 recognizes both the display device 107 (FIG. 5) of the notebook PC 6 and the display 3 (FIG. 4) of the electronic blackboard 2 as displays on which screens are to be displayed. In this case, the notebook PC 6 can be set up to display the same screen on the displays (hereinafter referred to as "duplicate") or display different screens on the displays (hereinafter referred to as "extend"). Specifically, in the case where Windows 7 (registered trademark) is used as the OS, a user may select either "Extend display screen" or "Duplicate display screen" from the "Multiple displays" drop-down list included in the "Screen Resolution" setting menu. For example, depending on the setting, the screen displayed on each display may be as follows.

Figure 7:
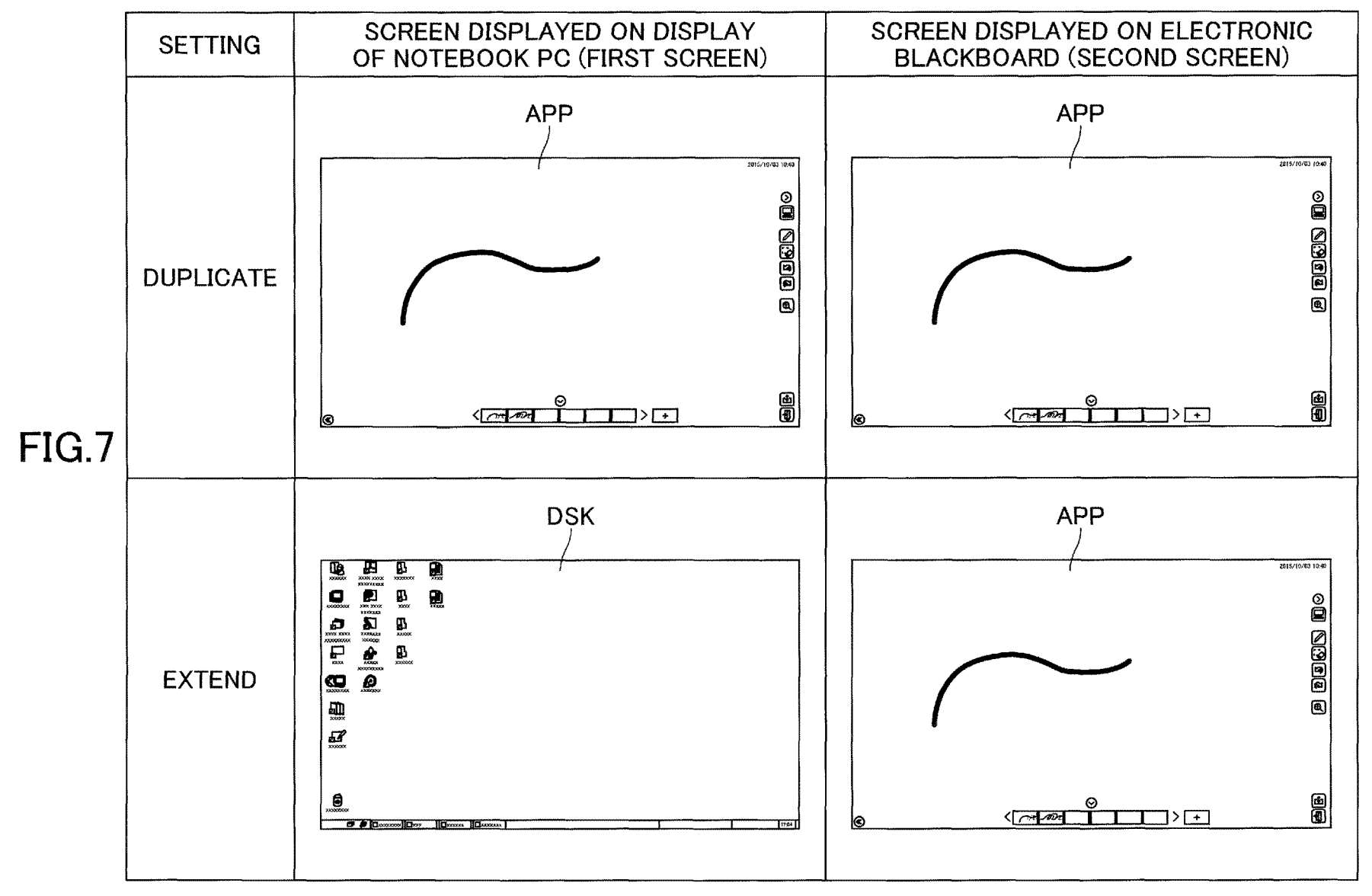

FIG. 7 is a table illustrating example screens displayed by the image processing apparatus according to the present embodiment. In the illustrated table, the upper row (row indicated as "duplicate") shows example screens displayed on the displays when "duplicate" is set up in the notebook PC 6. On the other hand, the lower row (row indicated as "extend") in the illustrated table shows example screens displayed on the displays when "extend" is set up in the notebook PC 6.

In the following, the screen displayed on the display of the notebook PC 6 is referred to as "first screen". In the example where the electronic blackboard 2 is connected to the notebook PC 6 as illustrated in FIG. 2, the screen displayed on the display 3 of the electronic blackboard 2 is referred to as "second screen".

When the application is installed in the notebook PC 6 as described above in connection with FIG. 2, the notebook PC 6 may display an application screen APP as illustrated in FIG. 7, for example. By inputting an operation with respect to this application screen APP, the user may be able to use the electronic blackboard 2 by inputting operations to the notebook PC 6.

Referring back to FIG. 7, depending on the setting, the notebook PC 6 can switch between displaying the same screen on the first screen and the second screen and displaying different screens on the first screen and the second screen. Specifically, in the illustrated example, when the "duplicate" setting is implemented, the notebook PC 6 displays the application screen APP on both the first screen and the second screen. In this setting, the same screen is to be displayed on the first screen and the second screen, and as such, for example, when an operation is input with respect to the application screen APP displayed on the first screen, a screen undergoing the same operation may also be displayed on the second screen.

On the other hand, in the illustrated example, when the "extend" setting is implemented, the notebook PC 6 displays a desktop screen DSK on the first screen and the application screen APP on the second screen. In the following, the case where the "extend" setting is set up in the notebook PC 6 will be described as an example.

In this example, the desktop screen DSK is displayed on the first screen, and a user may input an operation with respect to the desktop screen DSK to perform an operation, such as creating a document, editing an image, or the like, using an installed program, for example. Note that the screen displayed on the first screen is not displayed on the display 3 of the electronic blackboard 2. Thus, even when a work-in-progress screen or a screen showing confidential data is displayed on the first screen, the first screen may not be viewed by anyone other than the user interacting with the notebook PC such that the user interacting with the notebook PC can operate the notebook PC 6 in private.

On the other hand, the screen displayed on the second screen is displayed by the application screen APP to both the user interacting with the notebook PC 6 and participants of a conference viewing the electronic blackboard 2, for example. That is, information may be displayed on the second screen by the application screen APP to enable information sharing, for example.

Also, in the "extend" setting, a GUI (Graphical User Interface) such as a toolbar may be moved to/from the first screen and the second screen based on a user operation. That is, in the "extend" setting, the user can operate a GUI as if the first screen and the second screen constitute one continuous screen. For example, the user can move an icon displayed on the desktop screen DSK to the application screen APP by an operation such as the so-called drag-and-drop operation.

Also, oftentimes, material prepared by the user operating the notebook PC is captured and the captured image of the material is displayed on the electronic blackboard. In the following, an example case where the "duplicate" setting is set up and an example case where the "extend" setting is set up will be described.

Figure 8:
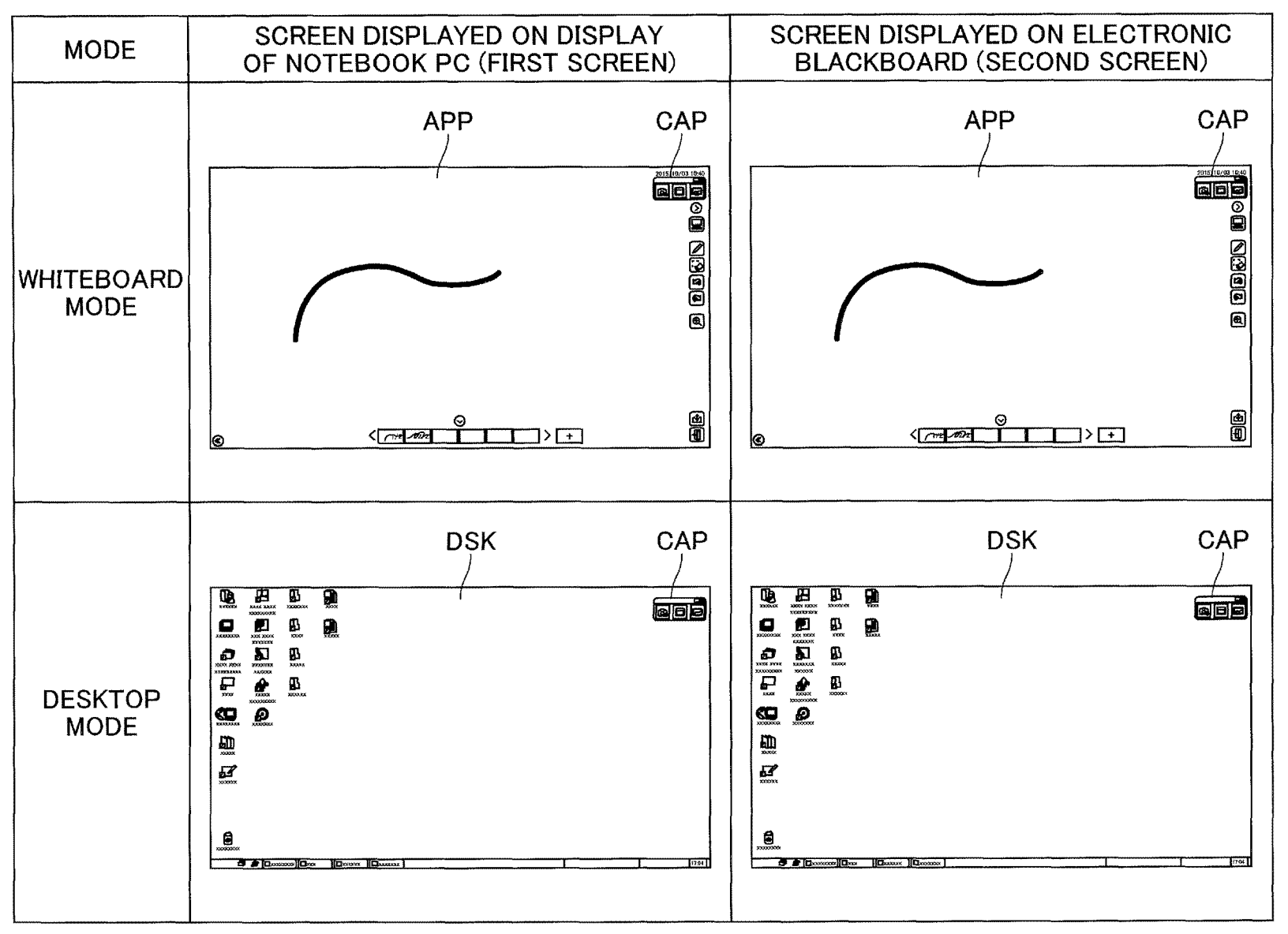

FIG. 8 is a diagram illustrating example screens in the case where the "duplicate" setting is set up in the image processing apparatus according to the present embodiment. Note that FIG. 8 illustrates example screens displayed on the first and second screens when the "duplicate" setting is set up in the notebook PC.

In the following description, "whiteboard mode" refers to a case where the user uses the electronic blackboard by operating the notebook PC, i.e., a case where the application screen APP is displayed. On the other hand, "desktop mode" refers to a case where the user performs an operation on the notebook PC other than using the electronic blackboard, i.e., a case where the application screen APP is minimized and the desktop screen DSK is displayed.

Also, the notebook PC generates an image to be displayed on the electronic blackboard (hereinafter referred to as "display image") in a capture process. That is, when the user inputs an instruction to generate a display image, i.e., an operation to execute the capture process, the notebook PC performs the capture process. Accordingly, the notebook PC displays a GUI that enables the user to input such instruction. For example, such a GUI may be a toolbar CAP as described below. In the following, an example of the toolbar CAP displayed in the whiteboard mode will be described.

Figure 9:
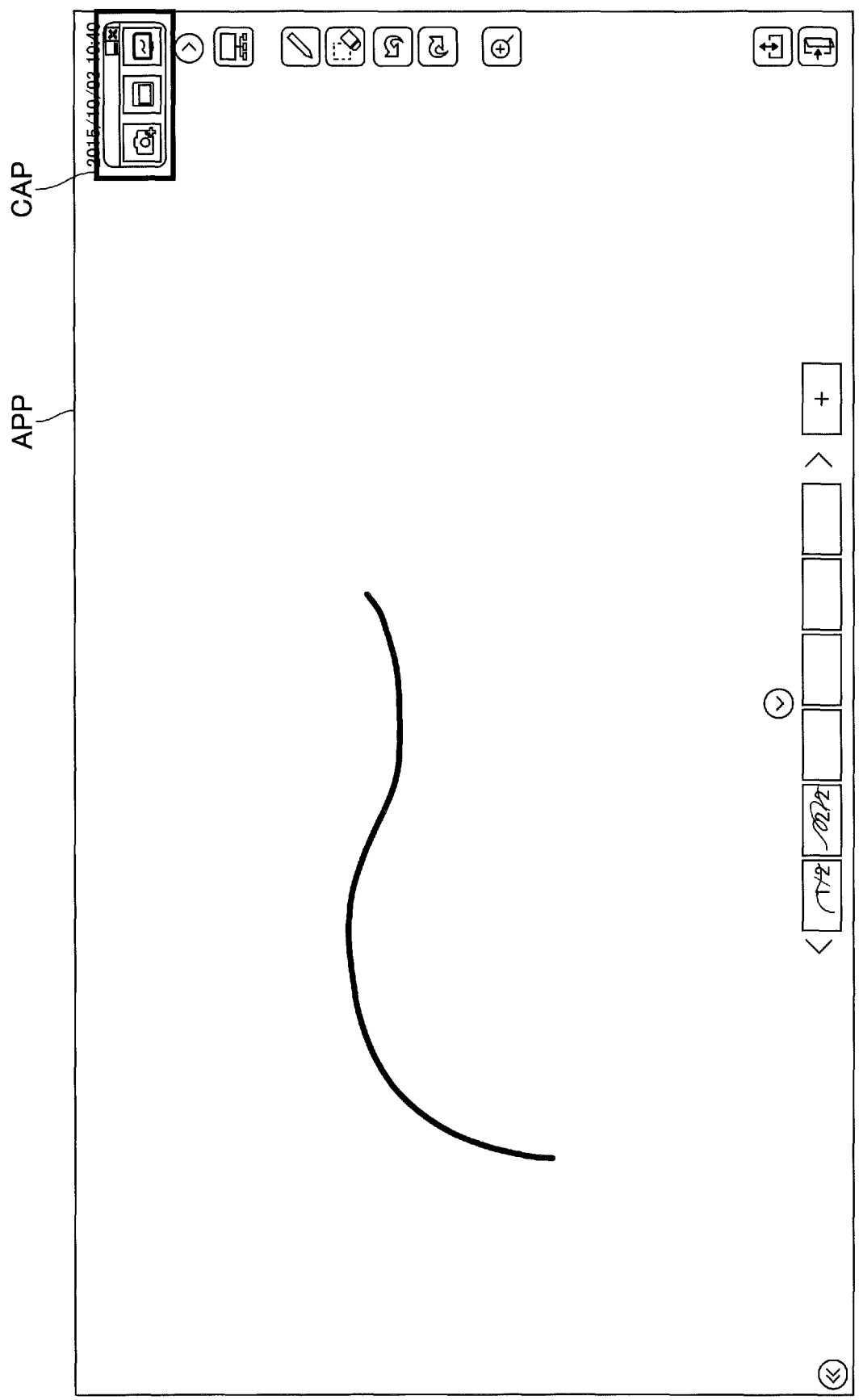
FIG. 9 is a diagram illustrating examples of an application screen and a graphical user interface displayed by the image processing apparatus according to an embodiment of the present invention.

FIG. 9 is a diagram illustrating an example GUI displayed by the image processing apparatus according to the present embodiment. FIG. 9 illustrates an example case where the toolbar CAP is displayed on the application screen APP by the notebook PC in the whiteboard mode. Note that the display position of the toolbar CAP may be changed by the user performing a drag-and-drop operation, for example. Note, also, that the toolbar CAP is preferably displayed on the application screen APP, i.e., on the forefront. The toolbar CAP will be described in detail below.

Figure 10:
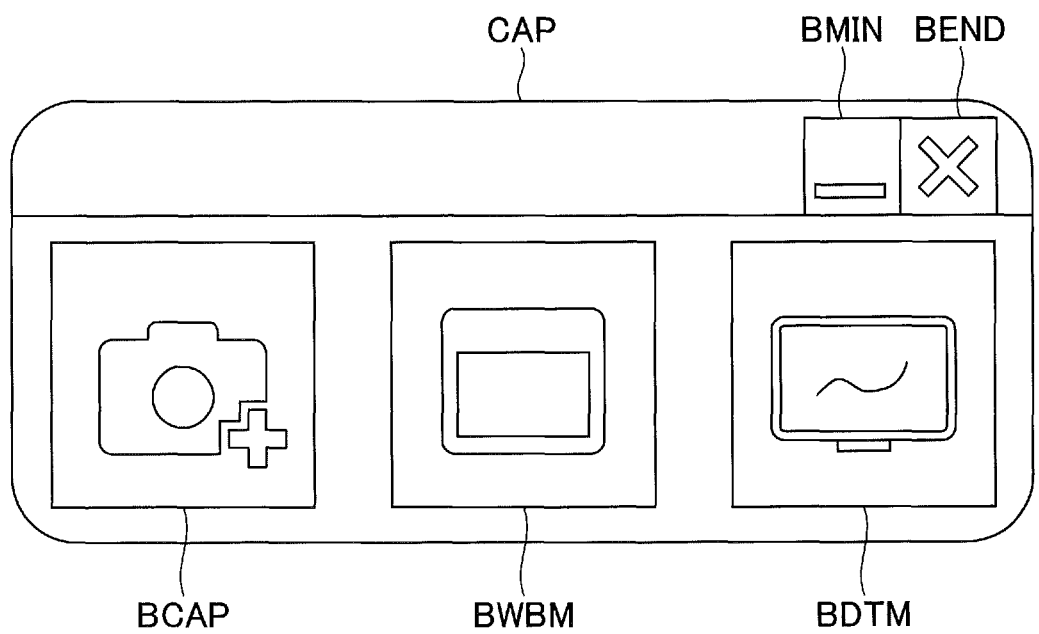
FIG. 10 is a diagram illustrating the graphical user interface displayed by the image processing apparatus according to an embodiment of the present invention.

FIG. 10 is a diagram illustrating an example of the toolbar displayed by the image processing apparatus according to the present embodiment. That is, FIG. 10 is an enlarged view of the toolbar CAP in FIG. 9. As illustrated in FIG. 10, the toolbar CAP may include a minimize button BMIN, an end button BEND, a capture button BCAP, a whiteboard button BWBM, and a desktop mode button BDTM, for example.

In the following, examples in which the following processes are performed when the user operates the toolbar CAP will be described.

(1) Process of capturing a screen displayed on the desktop screen DSK (FIG. 7) to generate a display image and having the generated display image imported into the application screen APP;

(2) Process of switching between whiteboard mode and desktop mode;

(3) Process of minimizing toolbar CAP (hide in taskbar); and (4) Process of ending application.

When the button of the toolbar CAP is pressed, the notebook PC executes the above processes (1) to (4) as follows.

When the minimize button BMIN is pressed, the notebook PC minimizes the toolbar CAP and the application screen APP. That is, the notebook PC accommodates the toolbar CAP and the application screen APP in a so-called taskbar. In this way, when the minimize button BMIN is pressed, the notebook PC performs the above process (3).

When the end button BEND is pressed, the notebook PC ends the application. In this way, when the end button BEND is pressed, the notebook PC performs the above process (4).

When the whiteboard button BWBM or the desktop mode button BDTM is pressed, the notebook PC switches between the whiteboard mode and the desktop mode. Specifically, when the desktop mode button BDTM is pressed while the display mode is in the whiteboard mode, the notebook PC switches from the whiteboard mode to the desktop mode. On the other hand, when the whiteboard button BWBM is pressed while the display mode is in the desktop mode, the notebook PC switches from the desktop mode to the whiteboard mode. In this way, when the whiteboard button BWBM or the desktop mode button BDTM is pressed, the notebook PC performs the above process (2).

When the capture button BCAP is pressed, the notebook PC selects one screen from among the first screen and the second screen (FIGS. 7 and 8) and generates a display image representing the selected screen. That is, when the capture button BCAP is pressed, the notebook PC performs the above process (1). Note that in the case where the "duplicate" setting is set up as illustrated in FIG. 8, the first screen and the second screen are the same screen whether the display mode is in the whiteboard mode or the desktop mode, and as such, the display image will be the same image irrespective of the screen that is selected.

On the other hand, as described below, the "extend" setting may be set up.

Figure 11:
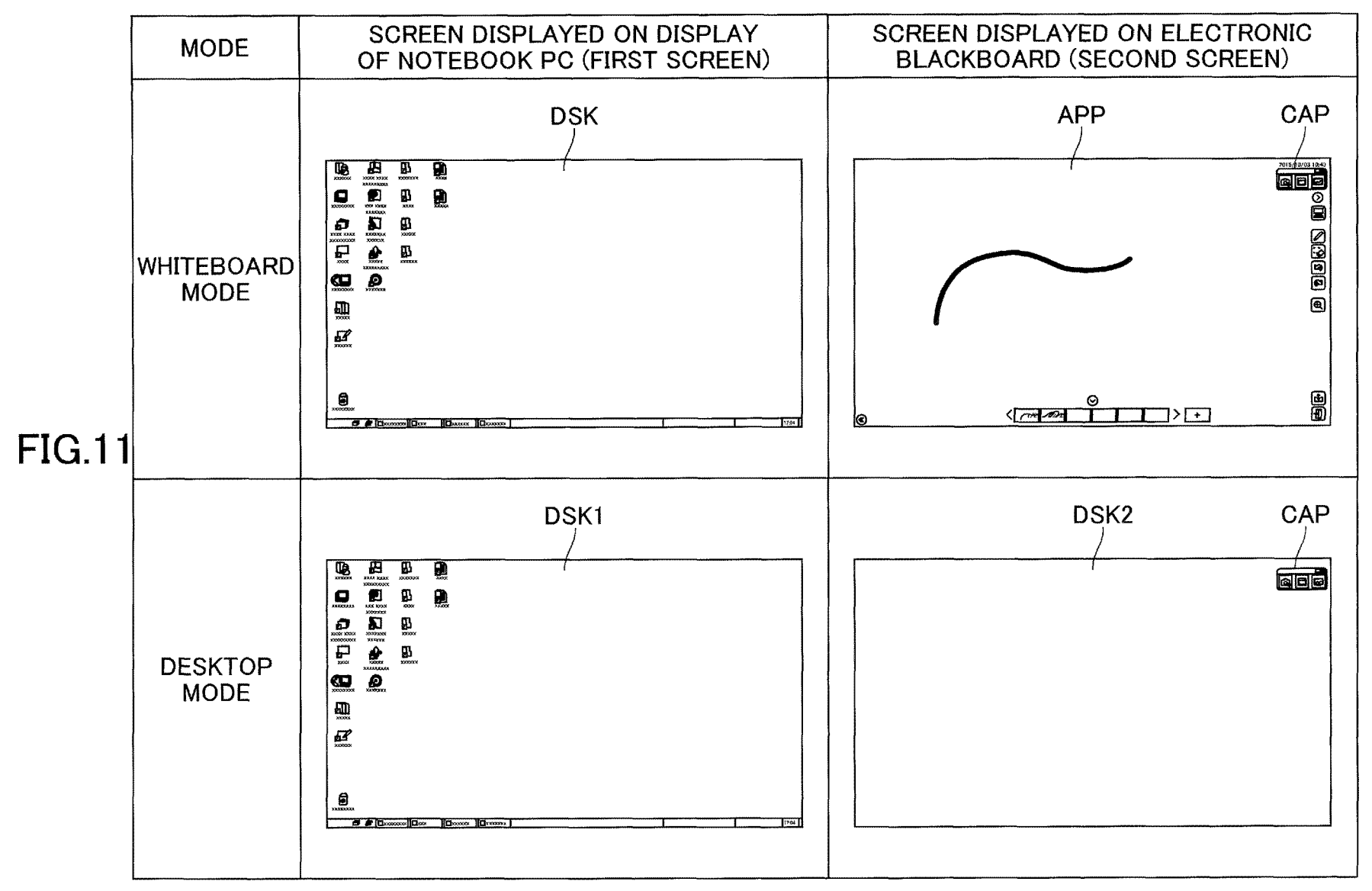

FIG. 11 is a diagram illustrating example screens when the "extend" setting is set up in the image processing apparatus according to the present embodiment. FIG. 11 illustrates example screens displayed on the first and second screens when the "extend" setting is set up in the notebook PC. As described above in connection with FIG. 7, when the "extend" setting is set up, the notebook PC displays different screens on the first screen and the second screen. As illustrated in FIG. 11, in the whiteboard mode, for example, the desktop screen DSK may be displayed on the first screen and the application screen APP may be displayed on the second screen.

On the other hand, as illustrated in FIG. 11, in the desktop mode, desktop screens may be displayed on both the first screen and the second screen, for example. However, the desktop screen displayed on the first screen (hereinafter referred to as "first desktop screen DSK1") and the desktop screen displayed on the second screen (hereinafter referred to as "second desktop screen DSK2") are different screens. That is, when the "extend" setting is set up and the display mode is in the desktop mode, for example, the notebook PC may be able to display different materials on the first desktop screen DSK1 and the second desktop screen DSK2 based on an operation input by the user. Note that in many cases, when the "extend" setting is set up and the display mode is in the desktop mode, the user wishes to select a capture target from among the first desktop screen DSK1 and the second desktop screen DSK2.

Thus, the notebook PC may determine which screen from among the first screen and the second screen is to be selected, i.e., the capture target, based on the display position of the toolbar CAP (FIG. 10), for example. Specifically, the notebook PC may make the determination by the following process, for example.

Figure 12:
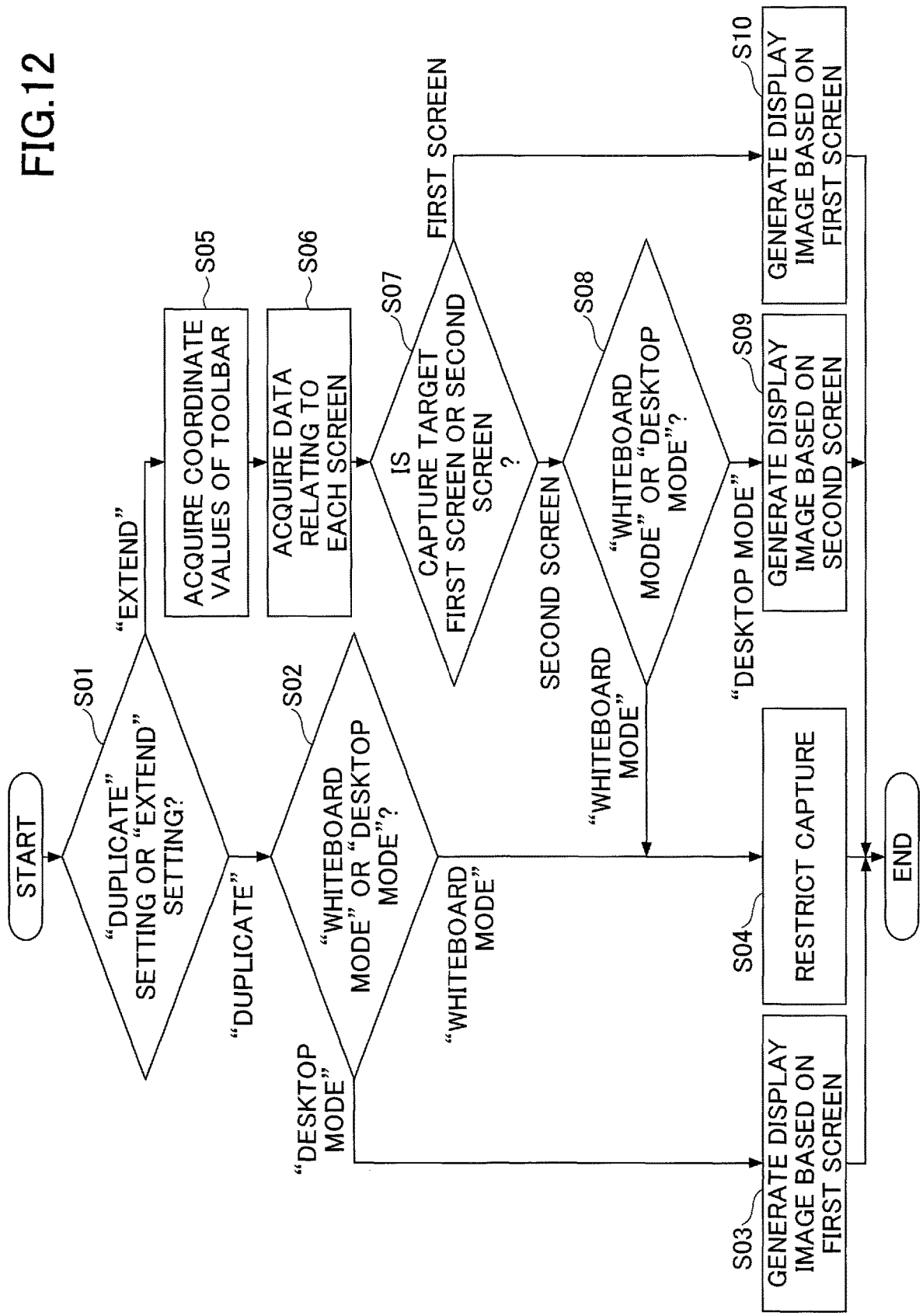
FIG. 12 is a flowchart illustrating a determination process implemented by the image processing apparatus according to an embodiment of the present invention.

FIG. 12 is a flowchart illustrating an example determination process implemented by the image processing apparatus according to the present embodiment. The illustrated determination process may be implemented by the notebook PC when the toolbar CAP (FIG. 10) is moved by a drag-and-drop operation, or when the display setting or display mode is switched, for example.

In step S01, the notebook PC determines whether the display setting is set to "duplicate" or "extend". For example, the notebook PC may acquire a setting value relating to display that is set up in advance by the user in the OS or the like and determine whether the display setting is set to "duplicate" or "extend" based on the acquired setting value. If the display setting is set to "duplicate", the notebook PC proceeds to step S02. On the other hand, if the display setting is set to "extend", the notebook PC proceeds to step S05.

In step S02, the notebook PC determines whether the current display mode is "whiteboard mode" or "desktop mode". For example, the notebook PC may make the above determination by determining which button from among the whiteboard button BWBM and the desktop mode button BDTM of FIG. 10 has been pressed most recently or by referring to a relevant OS setting. If it is determined that the display mode is the "desktop mode", the notebook PC proceeds to step S03. On the other hand, if it is determined that the display mode is the "whiteboard mode", the notebook PC proceeds to step S04.

In step S03, the notebook PC generates a display image based on the first screen. That is, when the "duplicate" setting and the "desktop mode" are implemented, and the capture button BCAP (FIG. 10) is pressed, the notebook PC captures the desktop screen DSK (FIG. 8). More specifically, the notebook PC stores an image representing the desktop screen DSK in the RAM 103 (FIG. 5).

In step S04, the notebook PC restricts capture. For example, the notebook PC may gray out the capture button BCAP, disable use of the capture button BCAP, or refrain from executing a capture process even when the capture button BCAP is pressed.

The user most likely wishes to capture the desktop screen DSK when the display mode is in the "whiteboard mode", irrespective of whether the display setting is set to "duplicate" or "extend". That is, because the screen displayed on the application screen APP (FIG. 7 and FIG. 8) is already displayed on the electronic blackboard, an operation of recapturing the screen and displaying an image thereof on the electronic blackboard is less likely to be performed.

In step S05, the notebook PC acquires coordinate values of the toolbar CAP. For example, the notebook PC may acquire the display position of a predetermined location of the toolbar CAP.

Figure 13:
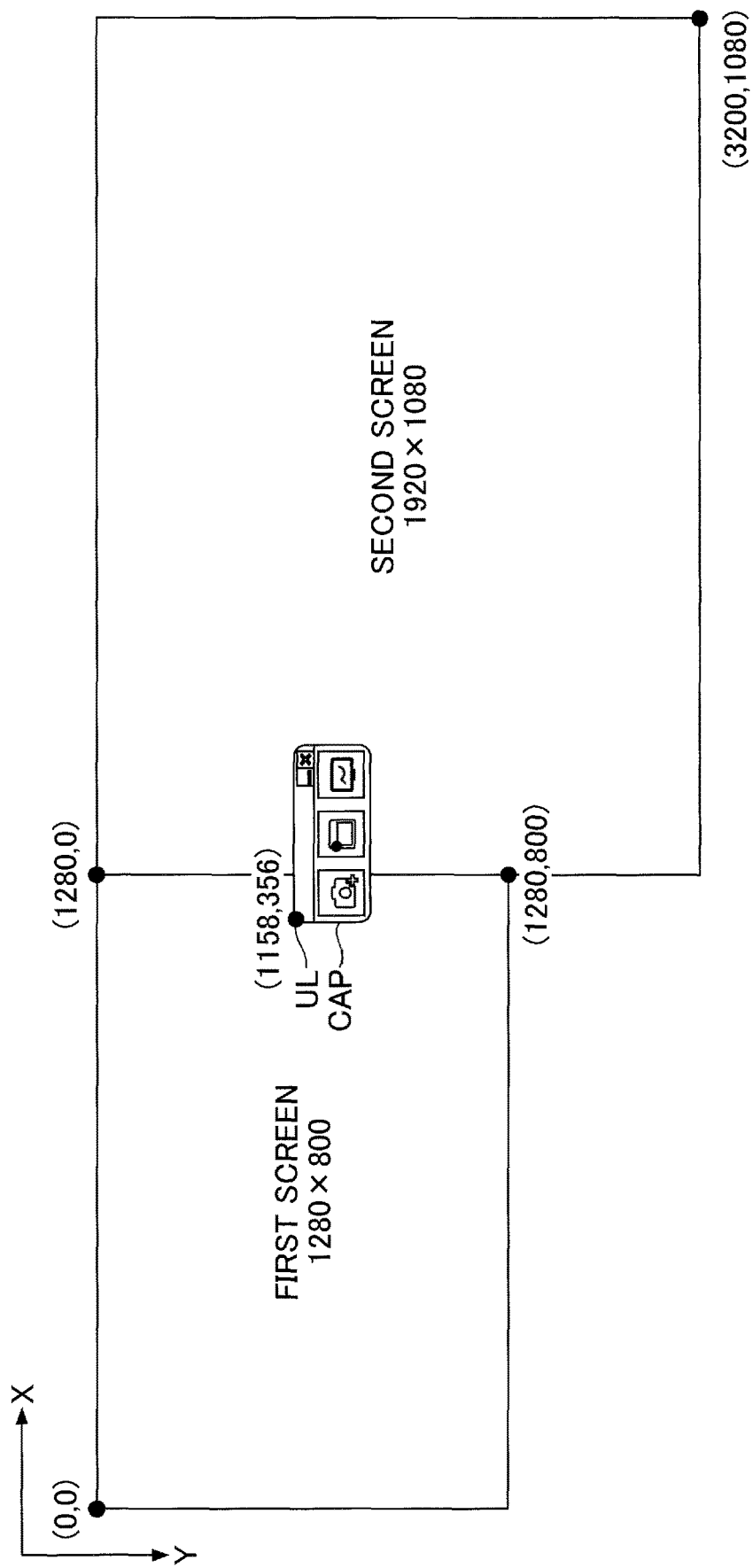
FIG. 13 is a diagram illustrating a determination process implemented by the image processing apparatus that involves using a predetermined location of the graphical user interface.

FIG. 13 is a diagram illustrating an example determination process implemented by the image processing apparatus according to the present embodiment that involves using a predetermined location of a GUI. In the following, an example in which the determination process is implemented with respect to a first screen and a second screen will be described.

First, in the present example, it is assumed that the first screen is set to a resolution of "1280×800" (so-called WXGA). On the other hand, in the present example, it is assumed that the second screen is set to a resolution of "1920×1080" (so-called FHD). Further, it is assumed that the upper left corner of the first screen is defined as the origin (0, 0). Also, in the present example, it is assumed that when the "extend" setting is set up, the right side edge of the first screen and the left side edge of the second screen are connected as illustrated in FIG. 13. Further, in the present example, the user can move the toolbar CAP within the first screen, within the second screen, or to/from the first screen and the second screen by a drag-and-drop operation. Note that the arrangement of the first screen and the second screen is not limited to the present example, and in other examples, the positions of the first screen and the second screen may be switched.

In step S05 (FIG. 12), the notebook PC acquires the coordinate values of a predetermined location of the toolbar CAP on the screen of FIG. 13. Note that the predetermined location is set up in advance. For example, the predetermined location may be a point at the upper left corner UL of the toolbar CAP. Note that the predetermined location may be a point other than that at the upper left corner UL. In the following, other example locations that may be set up as the predetermined location are described.

Figure 14:
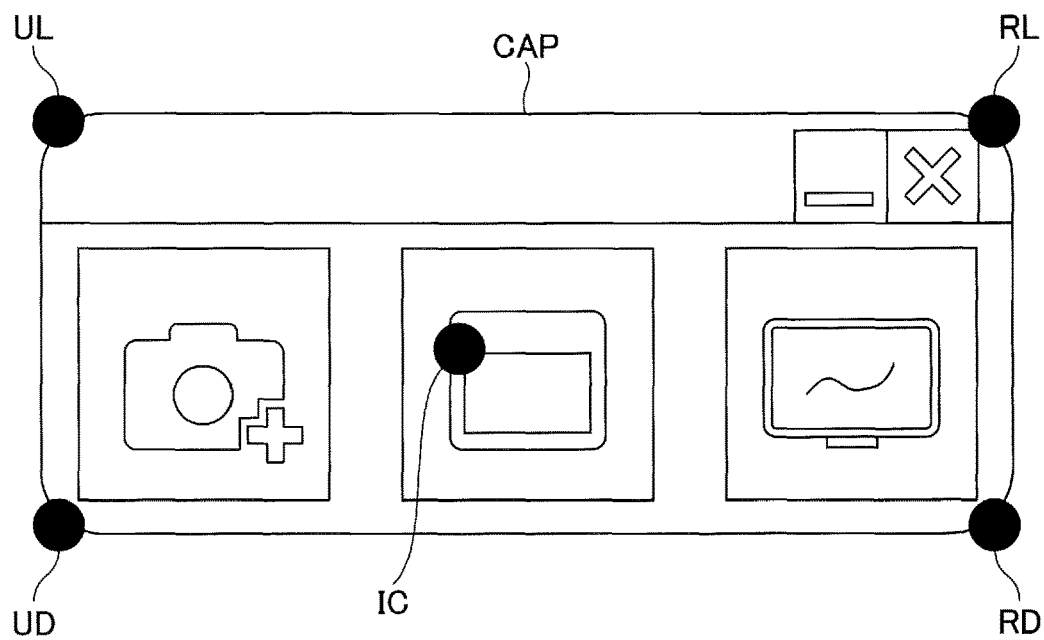
FIG. 14 is a diagram illustrating example predetermined locations of the graphical user interface displayed by the image processing apparatus according to an embodiment of the present invention.

FIG. 14 is a diagram illustrating example predetermined locations of a GUI displayed by the image processing apparatus according to the present embodiment. For example, the predetermined location for which coordinate values are to be acquired may be a point at one of the four corners of the toolbar CAP other than upper left corner UL. Specifically, as illustrated in FIG. 14, the predetermined location may be a point at the lower left corner UD, a point at the upper right corner RL, or a point at the lower right corner RD of the toolbar CAP, for example. Also, the predetermined location may be a point at the center IC or a point designated by the user, for example.

In step S06, the notebook PC acquires data relating to each screen. For example, in the example illustrated in FIG. 13, the notebook PC may acquire data indicating the resolution (region information) of the first screen and the second screen. As a result, in the example illustrated in FIG. 13, the notebook PC can determine that the first screen corresponds to a region with X-axis coordinate values ranging from "0" to "1279", i.e., a region with X-axis coordinate values that are less than or equal to "1279". On the other hand, in the example illustrated in FIG. 13, the notebook PC can determine that the second screen corresponds to a region with X-axis coordinate values ranging from "1280" to "3200", i.e., a region with X-axis coordinate values that are greater than or equal to "1280".

In step S07, the notebook PC determines whether the capture target is the first screen or the second screen. For example, the notebook PC may determine whether the coordinate values acquired in step S05 represents a point in the first screen or a point in the second screen based on the data acquired in step S06.

Specifically, in the example illustrated in FIG. 13, the notebook PC acquires the coordinate values (1158, 356) of the point at the upper left corner UL in step S05. Then, based on the data acquired in step S06, the notebook PC determines whether the X-coordinate value of the point at the upper left corner UL is less than or equal to "1279" or greater than or equal to "1280". In this case, the acquired X-coordinate value "1158" is less than or equal to "1279", and as such, the notebook PC determines that the point is in the first screen. That is, if the point at the upper left corner UL is in the left side region of FIG. 13, the notebook PC determines that the point is in the first screen ("first screen" in step S07). On the other hand, if the point at the upper left corner UL is in the right side region of FIG. 13, the notebook PC determines that the point is in the second screen ("second screen" in step S07).

Note that the method of determining whether the capture target is the first screen or the second screen is not limited to the above-described method using the coordinate values of a predetermined location. For example, a determination method using the area of the toolbar CAP as described below may be used.

Figure 15:
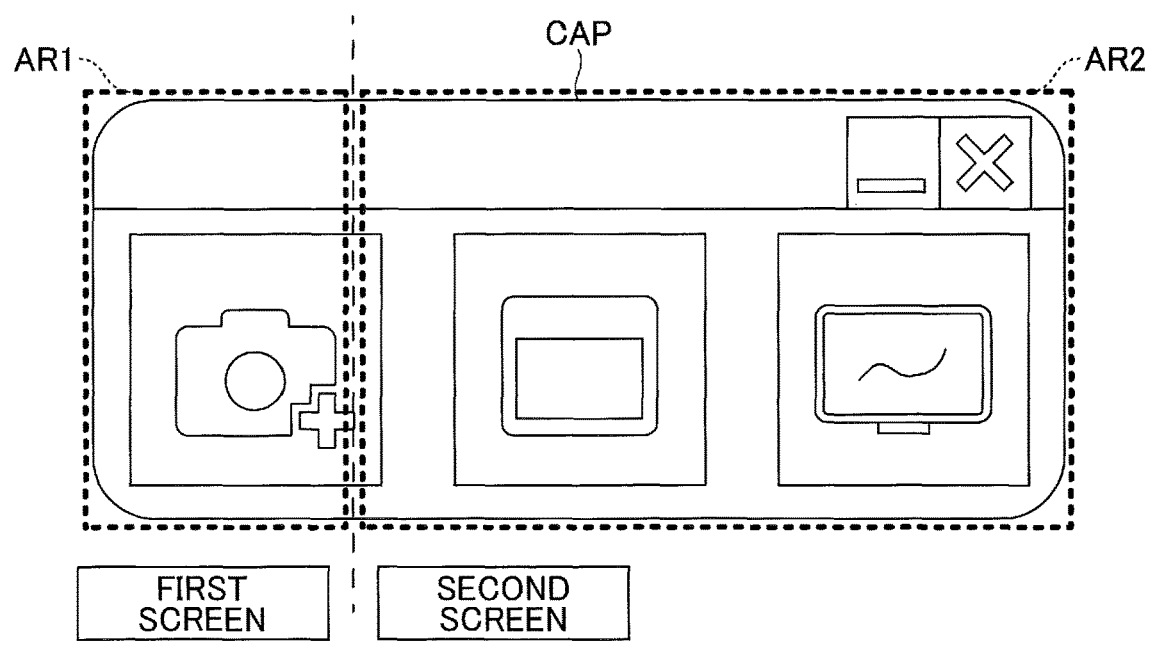
FIG. 15 is a diagram illustrating a determination process that involves using an area of the graphical user interface displayed by the image processing apparatus according to an embodiment of the present invention.

FIG. 15 is a diagram illustrating an example determination process that involves using the area of a GUI displayed by the image processing apparatus according to the present embodiment. In the following description, an area of the toolbar CAP that is displayed on the first screen of FIG. 13 out of the entire area of the toolbar CAP is referred to as "first area AR1". On the other hand, an area of the toolbar CAP that is displayed on the second screen of FIG. 13 out of the entire area of the toolbar CAP is referred to as "second area AR2". FIG. 15 is an example representation of the first area AR1 and the second area AR2. In the illustrated example, when comparing the first area AR1 and the second area AR2, it can be appreciated that the second area AR2 is greater than the first area AR1. Accordingly, in this case, the notebook PC determines that the capture target is the second screen ("second screen" in step S07 of FIG. 12).

Also, as another example determination method, the user may be promoted to input the screen to be captured. For example, upon executing a capture process, the notebook PC may display a message prompting the user to click on one of the regions (screens) illustrated in FIG. 13. Then, in response to the display of the message, the user may input an operation of clicking on a point included in one of the regions illustrated in FIG. 13. Then, in step S05 (FIG. 12), the notebook PC may acquire the coordinate values of the clicked point. Then, in step S07 (FIG. 12), the notebook PC may determine whether the coordinate value of the clicked point is located in the first screen or the second screen based on the data acquired in step S06 (FIG. 12). In other words, the user may click on the region displaying the screen desired as the capture target, and the capture target may be determined by the notebook PC based on the coordinate value of the clicked point.

As another method of prompting the user to input the capture target, for example, buttons for selecting a capture target may be displayed when executing a capture process, and the user may be prompted to input a selection operation. That is, upon executing a capture process, the notebook PC may display a button indicating "set first screen as capture target" and a button indicating "set second screen as capture target", for example. Then, the notebook PC may determine the screen that has been selected based on the button that has been pressed by the user and determine that the selected screen corresponds to the capture target.

Further, the determination method is not limited to a method using the X-coordinate value. For example, depending on the setting or the like, the first screen and the second screen may be connected in the following manner.

Figure 16:
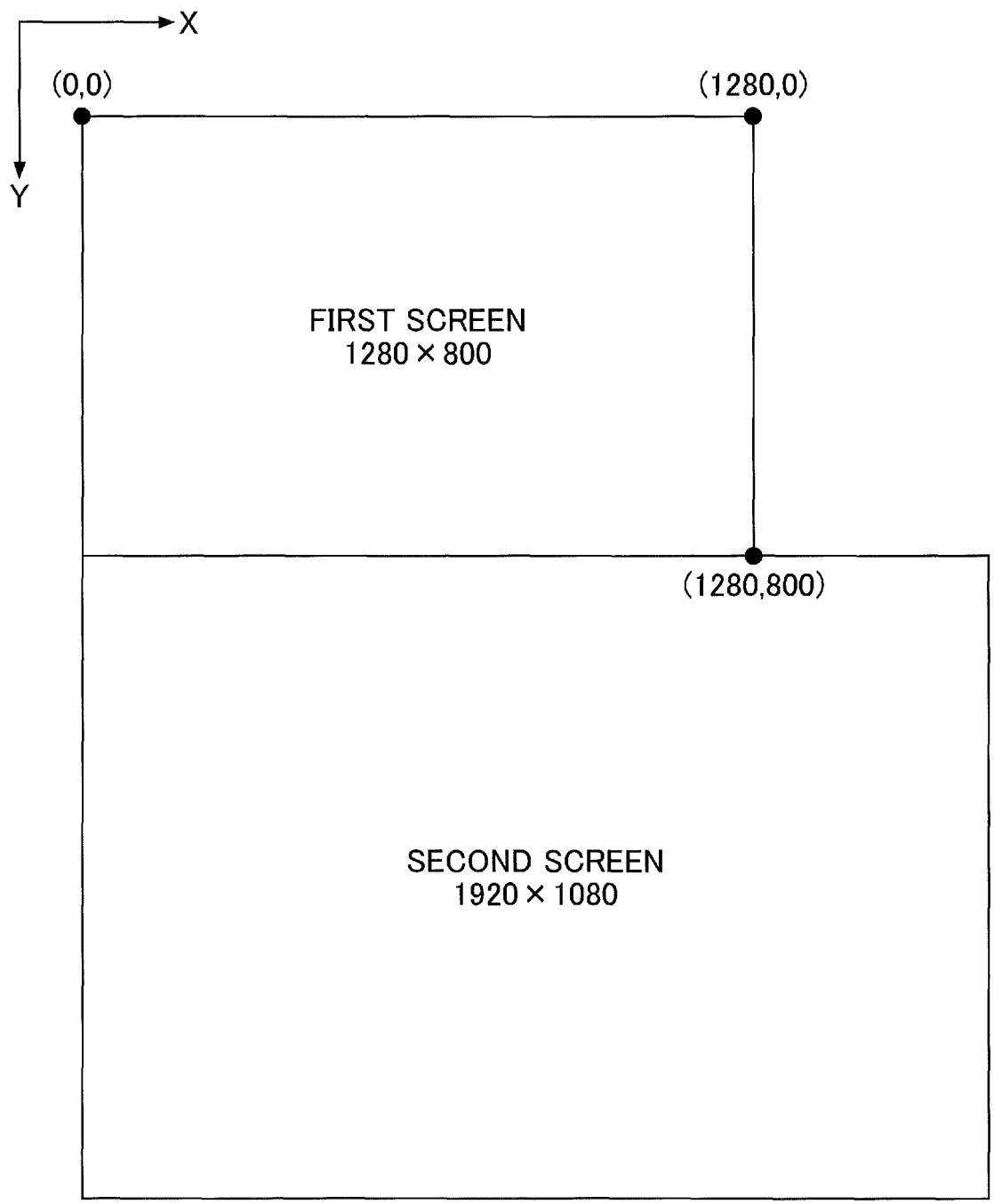
FIG. 16 is a diagram illustrating example screens displayed by the image processing apparatus in a case where the Y coordinate value is used.

FIG. 16 is a diagram illustrating example screens displayed by the image processing apparatus according to the present embodiment in a case of using the Y-coordinate value. As illustrated in FIG. 16, the first screen and the second screen may be connected vertically, i.e., in the Y-axis direction. In such a case, in step S07 (FIG. 12), the notebook PC determines the capture target using the Y-coordinate value of the coordinate values acquired in step S05 (FIG. 12).

Referring back to FIG. 12, in step S08, the notebook PC determines whether the display mode is in the "white board mode" or the "desktop mode". For example, in step S08, the notebook PC may determine the display mode in the same manner as step S02. If it is determined that the display mode is in the "desktop mode", the notebook PC proceeds to step S09. On the other hand, if it is determined that the display mode is in the "whiteboard mode", the notebook PC proceeds to step S04.

In step S09, the notebook PC generates a display image based on the second screen. That is, when the "extend" setting and the "desktop mode" are implemented, and the capture button BCAP (FIG. 10) is pressed, the notebook PC captures the desktop screen that has been determined to be the capture target in step S07. More specifically, in step S09, the notebook PC captures the second desktop screen DSK2 (FIG. 11), i.e., stores an image representing the second desktop screen DSK2 in the RAM 103 (FIG. 5).

In step S10, the notebook PC generates a display image based on the first screen. That is, when the "extend" setting and the "desktop mode" are implemented, and the capture button BCAP (FIG. 10) is pressed, the notebook PC captures the desktop screen that has been determined to be the capture target in step S07. More specifically, in step S10, the notebook PC captures the first desktop screen DSK1 (FIG. 11). For example, step S10 may perform the same process as that of step S03.

With the determination process as described above, a user can select the screen to be captured by moving the toolbar CAP. Note that the user may also input an operation of moving material to be displayed toward the screen that is to be determined as the capture target to achieve a similar effect. Particularly, when the "extend" setting and the "desktop mode" are implemented as illustrated in the lower row of FIG. 11, the user will likely wish to make a selection between the first desktop screen DSK1 (FIG. 11) and the second desktop screen DSK2 (FIG. 11) as the capture target. Thus, in the example illustrated in FIG. 13, the user may input an operation of moving the toolbar CAP such that the point at the upper left corner UL is positioned in the region displaying the screen to be determined as the capture target. Then, when the notebook PC performs the determination process as illustrated in FIG. 12, the notebook PC may determine the screen from among the first screen and the second screen that the user wishes to capture, i.e., the screen desired as a display image by the user.

In this way, even when the notebook PC displays a plurality of screens, the notebook PC can capture the screen desired as a display image by the user and generate the display image of the desired screen. When the display image that has been generated by capturing the desired screen as described above is imported into the image display apparatus, material or the like prepared by the user at the notebook PC may be displayed by the image display apparatus.

Second Embodiment

A second embodiment of the present invention may be implemented by the same overall configuration and hardware configuration as those of the first embodiment, for example. In the following, an example implementation of the second embodiment having an overall configuration and a hardware configuration substantially identical to those of the first embodiment will be described, and overlapping descriptions will be omitted. The second embodiment differs from the first embodiment in that a condition determination process as described below is implemented.

<Condition Determination Process Example>

For example, the notebook PC may include a condition determination unit that performs a screen determination process as described below. The condition determination unit may be implemented by the CPU 101 (FIG. 5), for example.

Figure 17:
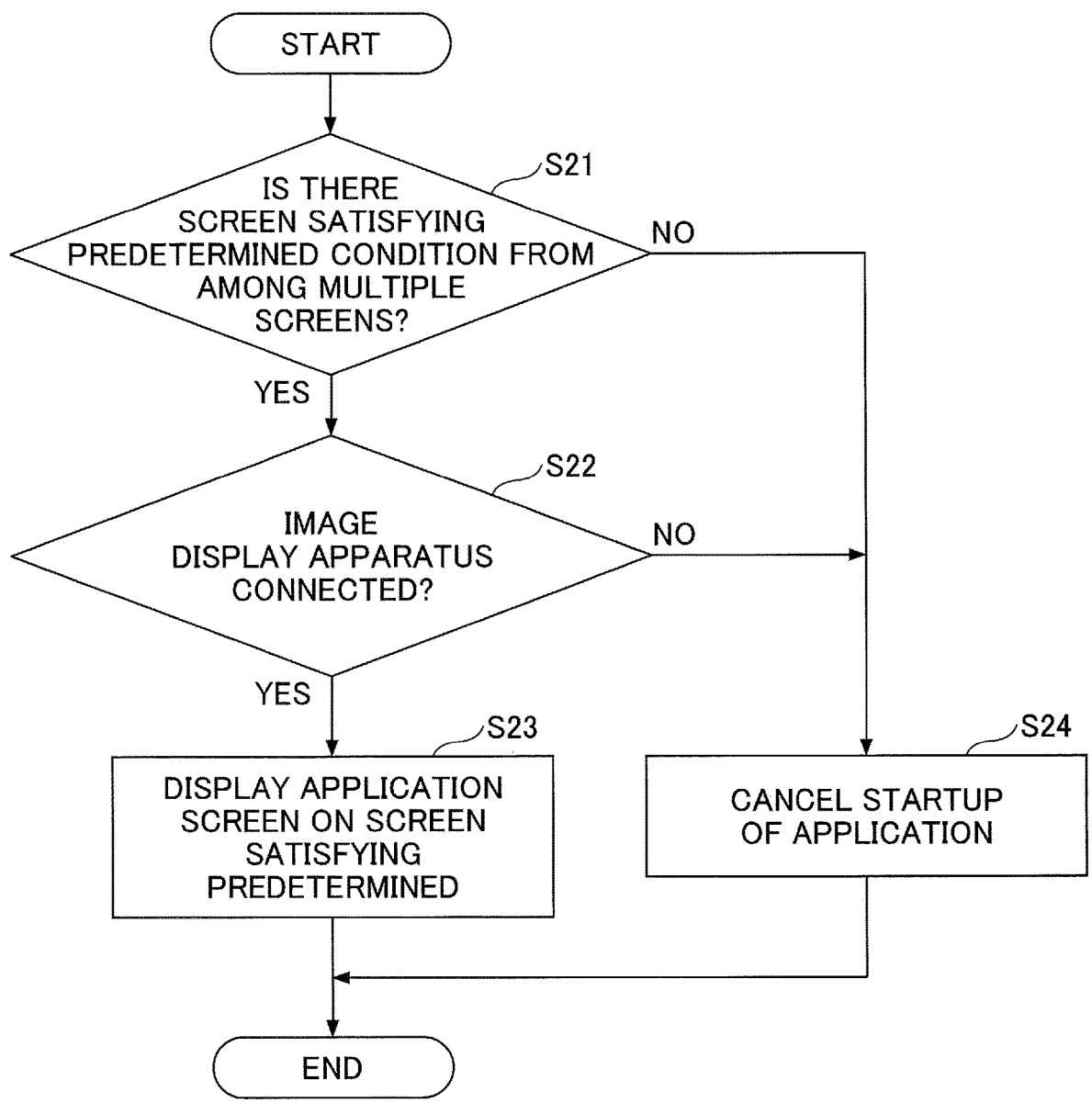
FIG. 17 is a flowchart illustrating a condition determination process implemented by the image processing apparatus according to an embodiment of the present invention.

FIG. 17 is a flowchart illustrating an example condition determination process implemented by the image processing apparatus according to the present embodiment. Note that the condition determination process is a process that may be implemented when starting an application, changing a setting relating to a screen, and the like.

In step S21, the notebook PC determines whether there is a screen satisfying a predetermined condition from among a plurality of screens. In the following, the example as illustrated in FIG. 2 in which the notebook PC 6 displays screens on the display of the notebook PC 6 and the display of the electronic blackboard 2 will be described. In such a case, depending on the specification of the electronic blackboard 2, there may be cases where a screen to be displayed on the display of the electronic blackboard 2 cannot be displayed by the electronic blackboard 2 unless the screen satisfies a predetermined condition, for example.

The predetermined condition may be that the screen has a predetermined resolution or a resolution that is greater than or equal to a predetermined resolution, for example. In the following, an example will be described in which a screen to be displayed on the display of the electronic blackboard 2 cannot be displayed on the display of the electronic blackboard 2 unless the screen has a resolution of "1920× 1080" (hereinafter referred to as "FHD"). In the present example, "FHD Resolution Screen" is set up as the predetermined condition in the notebook PC by the user. Also, in the following, the case where the "extend" setting is set up in the notebook PC as illustrated in FIG. 11 will be described as an example.

In the present example, in step S21, the notebook PC determines whether the resolution of one or both of the first screen and the second screen corresponds to the FHD resolution. Note that the notebook PC may acquire the resolution of each screen by the process of step S06 of FIG. 12, for example. In the example illustrated in FIG. 13, the second screen has a resolution of "1920×1080", and as such, the notebook PC determines that the second screen is a FHD screen. Thus, with respect to the example screens illustrated in FIG. 13, the notebook PC determines that there is a screen satisfying a predetermined condition in step S21 (YES in step S21).

If there is a screen satisfying a predetermined condition from among the plurality of screens (YES in step S21), the notebook PC proceeds to step S22. On the other hand, if there is no screen satisfying the predetermined condition from among the plurality of screens (NO in step S21), the notebook PC proceeds to step S24.

In step S22, the notebook PC determines whether an image display apparatus is connected to the notebook PC. For example, the notebook PC may determine whether the electronic blackboard 2 is connected thereto by determining whether the cable 10 of FIG. 2 is electrically connected to the electronic blackboard 2.

In the present example, if the cable 10 is not electrically connected to the electronic blackboard 2, the notebook PC may not be able to receive various data from the electronic blackboard 2. That is, even when data is written on the electronic blackboard 2, the data may not be transmitted to the application. Thus, by determining whether the cable 10 is electrically connected in step S22, the notebook PC can reduce instances in which data written on the electronic blackboard 2 is not reflected in the application.

If the image display apparatus is connected to the notebook PC (YES in step S22), the notebook PC proceeds to step S23. On the other hand, if the image display apparatus is not connected to the notebook PC (NO in step S22), the notebook PC proceeds to step S24.

Note that steps S21 and S22 may be performed separately as illustrated in FIG. 17, or alternatively, the determination criteria of step S22 may be included in the predetermined condition of step S21, for example.

In step S23, the notebook PC displays the application screen on the screen satisfying the predetermined condition. For example, in the example illustrated in FIG. 13, the second screen is a screen satisfying the predetermined condition. Thus, in step S23, the notebook PC displays the application screen APP (FIG. 7) on the second screen. In this way, the notebook PC may display the screen indicated in the lower row ("extend" column) of FIG. 7, for example.

In step S24, the notebook PC cancels startup of the application.

With such a condition determination process, the notebook PC can identify a screen satisfying a predetermined condition, such as a condition relating to the screen resolution, from among a plurality of screens. Depending on the specification of the image display apparatus, for example, the image display apparatus may not be able to display a screen unless the screen satisfies a predetermined condition. As such, the application screen APP (FIG. 7) is preferably displayed on a screen satisfying a predetermined condition. Thus, the notebook PC first determines whether there is a screen satisfying a predetermined condition. Then, when there is a screen satisfying the predetermined condition, the notebook PC displays the application screen APP on the screen satisfying the predetermined condition.

When the application screen APP is displayed on a screen satisfying a predetermined condition as described above, in many cases, the user performs operations with respect to the application screen APP displayed on the screen satisfying the predetermined condition. Thus, the notebook PC displays a screen that can be displayed by the image display apparatus on the image display apparatus via the application.

In some cases, the user may not know which screen of the plurality of screens is a screen satisfying a predetermined condition. In such case, the user may not be able to determine the screen on which the application screen APP should be displayed upon using the image display apparatus. Thus, by having the notebook PC determine whether there is a screen satisfying a predetermined condition upon starting the application, the user may be able to reliably use the image display apparatus via the application.

Note that even when the "duplicate" setting is set up in the notebook PC, there may be cases where the application screen APP cannot fit into an underlying screen unless the resolution of the screen is greater than or equal to a predetermined resolution, for example. Thus, the above-described method may also be implemented when the "duplicate" setting is set up in the notebook PC.

<Other Modifications>

Although the present invention has been described above with reference to certain example embodiments, the present invention is not limited to these embodiments, and various modifications and substitutions may be made without departing from the scope of the present invention.

Note that although the term "electronic blackboard 2" (FIG. 2) is used to in the above-described embodiments, the electronic blackboard 2 may also be referred to as "electronic information board", "electronic white board", or "interactive white board", for example.

Also, although the electronic blackboard 2 has been described as an example image display apparatus in the above-described embodiments, the present invention may be implemented in other various types of devices used by an unspecified number of users that generate data and continually use the data.

Also, the illustrated configuration of the electronic blackboard 2 is divided into process units according to main functions in order to facilitate understanding of the processes implemented by the electronic blackboard 2. However, the present invention is not limited by the above division or names of process units. For example, the process units of the electronic blackboard 2 may be divided into more process units according to the processing content. Also, one process unit may be divided into multiple processes, for example.

Also, the image display apparatus and the image processing apparatus are not limited to being implemented by a single information processing apparatus. That is, the image display apparatus and the image processing apparatus may be implemented by an information processing system having two or more information processing apparatuses. In the image display apparatus or the image processing apparatus, distributed processing, redundant processing, parallel processing, or a combination thereof may be implemented to execute a part or all processes, for example.

Note that all or a part of the processes according to the present invention may be implemented by a program for enabling a computer to execute an image processing method that is written in a programming language such as an assembler, C, C++, C #, Java (registered trademark), or the like. That is, the program is a computer program for causing a computer such as an image processing apparatus to execute an image processing method.

Further, the program can be stored and distributed in a computer-readable recording medium such as a ROM or an EEPROM (Electrically Erasable Programmable ROM). Further, the recording medium may be an EPROM (Erasable Programmable ROM), a flash memory, a flexible disk, an optical disk, an SD (registered trademark) card, an MO, or the like. The program may also be distributed through an electric communication line, for example.

Numerous additional modifications and variations are possible in light of the above teachings. It is therefore to be understood that, within the scope of the appended claims, the disclosure of this patent specification may be practiced otherwise than as specifically described herein.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

Each of the functions of the described embodiments may be implemented by one or more processing circuits. A processing circuit includes a programmed processor. A processing circuit also includes devices such as an application specific integrated circuit (ASIC) and conventional circuit components arranged to perform the recited functions. The processing circuitry is implemented as at least a portion of a microprocessor. The processing circuitry may be implemented using one or more circuits, one or more microprocessors, microcontrollers, application specific integrated circuits, dedicated hardware, digital signal processors, microcomputers, central processing units, field programmable gate arrays, programmable logic devices, state machines, super computers, or any combination thereof. Also, the processing circuitry may include one or more software modules executable within one or more processing circuits. The processing circuitry may further include memory configured to store instructions and/or code that causes the processing circuitry to execute functions.

If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 101 in a computer system or other system. The machine code may be converted from the source code, etc. If embodied in hardware, each block may represent a circuit or a number of interconnected circuits to implement the specified logical function(s).

What is claimed is:

1. An image processing apparatus connected to an image display apparatus that displays visual information including handwritten data superimposed on a display image, the image processing apparatus comprising:
   circuitry configured to implement processes of
      displaying a plurality of screens, including a first screen on a display of the image display apparatus and a second screen, different from the first screen, on a display of the image processing apparatus, the display of the image processing apparatus serving as an extension of the display of the image display apparatus;

displaying a toolbar as a graphical user interface element, the toolbar being displayed on the first screen, the second screen, or straddling the first screen and the second screen;

selecting the screen from among the first screen and the second screen based on a positioning of the toolbar as displayed in either the first screen or the second screen, or straddling the first screen and the second screen;

capturing the selected screen from among the first screen and the second screen; and generating the display image based on the captured screen.

2. The image processing apparatus according to claim 1, wherein
the circuitry selects the screen from among the first screen and the second screen upon which to produce the display image based on whether a predetermined location of the toolbar is displayed on the first screen or the second screen.

3. The image processing apparatus according to claim 2, wherein the circuitry is further configured to:
compare a first area of the toolbar displayed on the first screen, which is an area of a portion of the toolbar displayed on the first screen, with a second area of the toolbar displayed on the second screen, which is the area of the portion of the toolbar displayed on the second screen, and select the screen on which the area of the portion of the toolbar displayed is greater as the screen upon which to produce the display image.

4. The image processing apparatus according to claim 1, wherein
the circuitry extends the plurality of screens to be displayed such that the first screen and the second screen are different screens.

5. The image processing apparatus according to claim 1, wherein the circuitry further implements processes of
determining whether there is a screen that satisfies a predetermined condition from among the plurality of screens; and displaying an application screen to be used in operating the image display apparatus on the screen that has been determined to satisfy the predetermined condition.

6. The image processing apparatus according to claim 5, wherein
the circuitry determines whether there is a screen from among the plurality of screens that has a predetermined resolution or a resolution greater than or equal to the predetermined resolution.

7. The image processing apparatus according to claim 1, wherein
the circuitry further implements processes of exporting the generated display image into the image display apparatus; and
the image display apparatus displays the generated display image of the selected screen.

8. An image processing system including an image display apparatus that displays visual information including handwritten data superimposed on a display image, and an image processing apparatus that is connected to the image display apparatus, the image processing system comprising:
circuitry configured to implement processes of
displaying a plurality of screens, including a first screen on a display of the image display apparatus and a second screen, different from the first screen, on a display of the image processing apparatus, the display of the image processing apparatus serving as an extension of the display of the image display apparatus;

displaying a toolbar as a graphical user interface element, the toolbar being displayed on the first screen, the second screen, or straddling the first screen and the second screen;

selecting the screen from among the first screen and the second screen based on a positioning of the toolbar as displayed in either the first screen or the second screen, or straddling the first screen and the second screen;

capturing the selected screen from among the first screen and the second screen; and generating the display image based on the captured screen.

9. The image processing system according to claim 8, wherein
the circuitry further implements processes of exporting the generated display image into the image display apparatus; and
the image display apparatus displays the generated display image of the selected screen.

10. An image processing method that is implemented by an image processing apparatus connected to an image display apparatus that displays visual information including handwritten data superimposed on a display image, the image processing method comprising:
displaying a plurality of screens, including a first screen on a display of the image display apparatus and a second screen, different from the first screen, on a display of the image processing apparatus, the display of the image processing apparatus serving as an extension of the display of the image display apparatus;

displaying a toolbar as a graphical user interface element, the toolbar being displayed on the first screen, the second screen, or straddling the first screen and the second screen;

selecting the screen from among the first screen and the second screen based on a positioning of the toolbar as displayed in either the first screen or the second screen, or straddling the first screen and the second screen;

capturing the selected screen from among the first screen and the second screen; and generating the display image based on the captured screen.

11. The image processing method according to claim 10 further comprising:
exporting the generated display image to the image display apparatus; and
displaying, by the image display apparatus, the generated display image of the selected screen.

* * * * *